(12) United States Patent
Uemura et al.

(10) Patent No.: US 11,869,399 B2
(45) Date of Patent: Jan. 9, 2024

(54) DRIVING CIRCUIT AND SEMICONDUCTOR INTEGRATED CIRCUIT FOR USE IN AN OPTICAL COMMUNICATION DEVICE

(71) Applicant: SUMITOMO ELECTRIC INDUSTRIES, LTD., Osaka (JP)

(72) Inventors: Hiroshi Uemura, Osaka (JP); Keiji Tanaka, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 20 days.

(21) Appl. No.: 17/528,802

(22) Filed: Nov. 17, 2021

(65) Prior Publication Data
US 2022/0157217 A1     May 19, 2022

(30) Foreign Application Priority Data
Nov. 19, 2020  (JP) .................................. 2020-192375

(51) Int. Cl.
G09G 3/20       (2006.01)

(52) U.S. Cl.
CPC ....... *G09G 3/20* (2013.01); *G09G 2310/0291* (2013.01); *G09G 2330/021* (2013.01)

(58) Field of Classification Search
None
See application file for complete search history.

(56) References Cited

U.S. PATENT DOCUMENTS

| 6,836,185 B1* | 12/2004 | Pobanz ................. G02F 1/0327 |
| | | 330/310 |
| 2008/0204148 A1* | 8/2008 | Kim ........................ H03F 3/195 |
| | | 330/306 |
| 2014/0333374 A1 | 11/2014 | Tatsumi |
| 2015/0263505 A1 | 9/2015 | Takada |
| 2020/0382067 A1* | 12/2020 | Kennan .................. H03F 3/195 |

FOREIGN PATENT DOCUMENTS

| JP | 2014-220770 | 11/2014 |
| JP | 2015-173214 | 10/2015 |

* cited by examiner

*Primary Examiner* — Amr A Awad
*Assistant Examiner* — Donna V Bocar
(74) *Attorney, Agent, or Firm* — SMITH, GAMBRELL & RUSSELL, LLP.

(57) ABSTRACT

A driving circuit includes first and second input signal terminals, first and second output signal terminals, constant current sources, first and second transistors having control terminals connected to the first and second input signal terminals, third and fourth transistors each having a control terminal to which a first bias voltage is applied, first and second inductors each having a first inductance, and third and fourth inductors each having a second inductance larger than the first inductance. The driving circuit further includes fifth and sixth transistors each having a control terminal to which a second bias voltage is applied, outflow terminals connected to inflow terminals of the third and fourth transistors via the first and second inductors, and inflow terminals connected to the first and second output signal terminals via the third and fourth inductors.

19 Claims, 11 Drawing Sheets

DRIVING CIRCUIT AND SEMICONDUCTOR INTEGRATED CIRCUIT FOR USE IN AN OPTICAL COMMUNICATION DEVICE

CROSS-REFERENCE TO RELATED APPLICATION

This application claims priority from Japanese Patent Application No. 2020-192375, filed on Nov. 19, 2020, the entire subject matter of which is incorporated herein by reference.

TECHNICAL FIELD

The present disclosure relates to a driving circuit and a semiconductor integrated circuit.

BACKGROUND

As a circuit built in an optical transmitter module or the like, an amplifier that amplifies an input voltage signal and outputs an output voltage signal is used. For example, as a configuration of a conventional amplifier, a configuration including a switching transistor, a first cascode transistor connected in series to the switching transistor, and a second cascode transistor connected in series to the first cascode transistor is known.

SUMMARY

A driving circuit according to one aspect of the present disclosure includes: a first input signal terminal and a second input signal terminal; a first output signal terminal and a second output signal terminal; a current source that supplies a constant current; a first transistor including a first control terminal connected to the first input signal terminal, a first outflow terminal connected to a ground line via the current source, and a first inflow terminal; a second transistor including a second control terminal connected to the second input signal terminal, a second outflow terminal connected to the ground line via the current source, and a second inflow terminal; a third transistor including a third control terminal to which a first bias voltage is to be applied, a third outflow terminal connected to the first inflow terminal, and a third inflow terminal; a fourth transistor including a fourth control terminal to which the first bias voltage is to be applied, a fourth outflow terminal connected to the second inflow terminal, and an fourth inflow terminal; a first inductor and a second inductor each having a first inductance; a third inductor and a fourth inductor each having a second inductance that is larger than the first inductance; a fifth transistor including a fifth control terminal to which a second bias voltage is to be applied, a fifth outflow terminal connected to the third inflow terminal via the first inductor, and a fifth inflow terminal connected to the first output signal terminal via the third inductor; and a sixth transistor including a sixth control terminal to which the second bias voltage is to be applied, an sixth outflow terminal connected to the fourth inflow terminal via the second inductor, and a sixth inflow terminal connected to the second output signal terminal via the fourth inductor.

Alternatively, a driving circuit according to another aspect of the present disclosure includes: an input signal terminal; an output signal terminal; a first transistor including a first control terminal connected to the input signal terminal, a first outflow terminal connected to a power source line, and a first inflow terminal; a second transistor including a second control terminal to which a first bias voltage is to be applied, a second outflow terminal connected to the first inflow terminal, and a second inflow terminal; a first inductor having a first inductance; a second inductor having a second inductance that is larger than the first inductance; and a third transistor including a third control terminal to which a second bias voltage is to be applied, a third outflow terminal connected to the second inflow terminal via the first inductor, and a third inflow terminal connected to the output signal terminal via the second inductor.

Alternatively, a semiconductor integrated circuit according to another aspect of the present disclosure includes the driving circuit described above and an amplifier circuit that amplifies an input signal and outputs the amplified input signal to the driving circuit.

DETAILED DESCRIPTION

Figure 1:
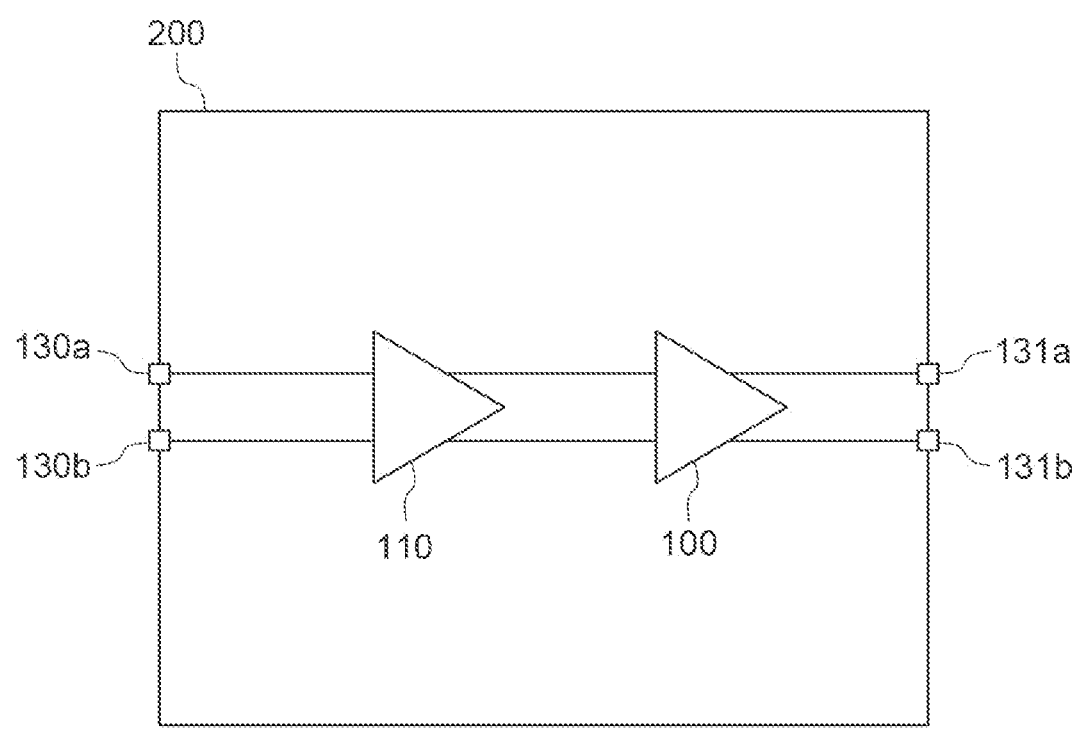
FIG. 1 is a block diagram showing a schematic configuration of a semiconductor integrated circuit 200 according to an embodiment.

Hereinafter, embodiments of the present disclosure will be described with reference to the drawings. In the description of the drawings, the same elements are denoted by the same reference numerals, and redundant description will be omitted.

FIG. 1 is a block diagram showing a configuration of a semiconductor integrated circuit 200 according to one embodiment. The semiconductor integrated circuit 200 is housed in an optical communication device such as an optical transmitter module, and is a semiconductor integrated circuit (IC) manufactured by a semiconductor process such as SiGe BiCMOS (Bipolar Complementary Metal Oxide Semiconductor). The chip size of semiconductor integrated circuits (ICs) is, for example, 2 mm×4 mm. The semiconductor integrated circuit 200 amplifies an input voltage signal, and outputs an amplified voltage signal. The semiconductor integrated circuit 200 includes a pair of input terminals 130a and 130b, a pair of output terminals 131a and 131b, an input circuit 110, and a driving circuit 100. In the following description, the IC may also be referred to as a semiconductor chip.

The input terminals 130a and 130b receive, for example, a differential signal composed of two signals having the same amplitudes and mutually inverted phases. The input circuit 110 amplifies the input differential signal and outputs it to the driving circuit 100. The driving circuit 100 further amplifies the differential signal output from the input circuit 110 and outputs the amplified signal to the outside of the semiconductor integrated circuit 200. For example, the driving circuit 100 is cascaded to the input circuit 110.

Note that the circuit configuration of the semiconductor integrated circuit 200 may be changed as appropriate, the input circuit 110 may be omitted, or various other circuits may be added. The signal transmission path (channel) is not limited to one configuration, and a plurality of channels (for example, four channels) may be arranged in parallel.

Next, the configuration of the driving circuit 100 according to the present embodiment will be described with reference to FIGS. 2 and 3. In the following description, the reference voltage is referred to as a ground potential (0 V) unless otherwise specified. For example, when the potential of a node in the circuit is Vnode, the potential difference between the potential of the node and the ground potential is the voltage Vnode. Therefore, the potential of the node and the voltage of the node are the same. Although the operation of a circuit is described using voltage as a term, voltage is equivalent to potential. When the ground potential is not used as a reference, a reference potential (e.g. emitter potential) is explicitly designated such as a base-emitter voltage of a transistor.

Figure 2:
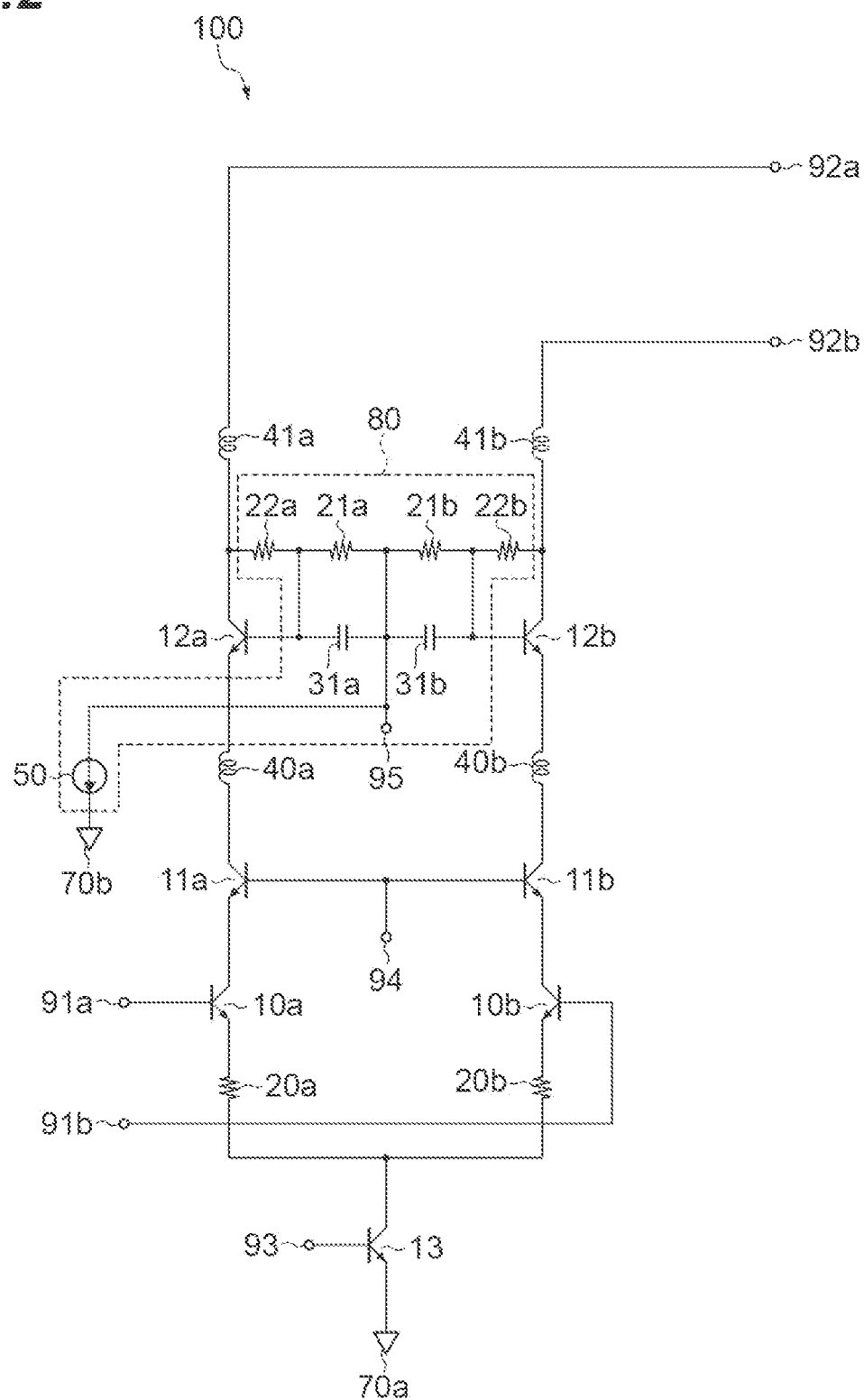
FIG. 2 is a circuit diagram showing a configuration of a driving circuit 100 according to an embodiment.

FIG. 2 is a circuit diagram showing a configuration of the driving circuit 100 according to the embodiment. FIG. 3 is a circuit diagram of the driving circuit 100 in a state in which the driving circuit 100 is connected to an external load. The driving circuit 100 is a differential amplifier circuit that outputs a differential current signal that is a current signal in accordance with a differential signal corresponding to a difference between two input voltage signals. The driving circuit 100 is formed on a Si substrate using a semiconductor process such as SiGe BiCMOS. The maximum power supply voltage of the semiconductor integrated circuit 200 in which the driving circuit 100 is mounted is, for example, 3.3 V. The input differential signal is, for example, an amplitude-constant binary signal (for example, an NRZ (Non Return to Zero) signal) or an amplitude-modulated signal having multiple values (for example, a PAM (Pulse Amplitude Modulation) 4 signal having four levels), and the modulation speed of these signals is, for example, 100 GBaud. The driving circuit 100 includes bipolar transistors 10a, 10b, 11a, 11b, 12a, 12b, 13, resistors 20a, 20b, 21a, 21b, 22a, 22b, capacitors 31a, 31b, inductors 40a, 40b, 41a, 41b, a current source 50, input signal terminals 91a, 91b, output signal terminals 92a, 92b, ground lines 70a, 70b, bias supply terminals 93, 94, and a connection node 95. Of these components, the resistors 21a, 21b, 22a, 22b, the capacitors 31a, 31b, and the current source 50 constitute a bias circuit 80.

Hereinafter, components constituting the driving circuit 100 will be described.

In the bipolar transistor (first transistor) 10a, a base (first control terminal) is connected to the input signal terminal 91a, a collector (first inflow terminal) is connected to an emitter of the bipolar transistor 11a, and an emitter (first outflow terminal) is connected to one end of the resistor 20a. In the bipolar transistor (second transistor) 10b, a base (second control terminal) is connected to the input signal terminal 91b, a collector (second inflow terminal) is connected to an emitter of the bipolar transistor 11b, and an emitter (second outflow terminal) is connected to one end of the resistor 20b. Here, the inflow terminal is a terminal through which a current controlled by the control terminal flows into the transistor, and the outflow terminal is a terminal through which a current controlled by the control terminal flows out of the transistor. The bipolar transistors 10a and 10b change respective collector currents according to respective input signals (for example, signals of frequencies equal to or higher than 30 GHz) input from the input signal terminals 91a and 91b to respective control terminals. The bipolar transistors 10a and 10b may be, for example, NPN-type heterojunction bipolar transistors (HBTs). The bipolar transistors 10a and 10b may be replaced with, for example, n-type metal oxide semiconductor (MOS) transistors. In this case, the gate of the MOS transistor corresponds to the base of the bipolar transistor, the drain of the MOS transistor corresponds to the collector of the bipolar transistor, and the source of the MOS transistor corresponds to the emitter of the bipolar transistor, respectively. Since the bipolar transistors 10a and 10b operate complementarily to each other, it is desirable that the electrical characteristics of the bipolar transistor 10a be equal to the electrical characteristics of the bipolar transistor 10b. The "electrical characteristics" as used herein means basic electrical characteristics of a bipolar transistor, such as a base current (base-emitter current) with respect to a base voltage (base-emitter voltage) and a collector current with respect to a collector voltage at a specific base current (base-emitter current). The electrical characteristics being equal to each other may be different from each other within a range of allowable manufacturing variation, for example, and are not limited to having completely the same value. The same applies to the following description.

In the bipolar transistor 11a (third transistor), a base (third control terminal) is connected to the bias supply terminal 94, an emitter (third outflow terminal) is connected to the collector of the bipolar transistor 10a, and a collector (third inflow terminal) is connected to one end of the inductor 40a. In the bipolar transistor (fourth transistor) 11b, a base (fourth control terminal) is connected to the bias supply terminal 94, an emitter (fourth outflow terminal) is connected to the collector of the bipolar transistor 10b, and a collector (fourth inflow terminal) is connected to one end of the inductor 40b. These bipolar transistors 11a and 11b are, for example, cascode transistors. For example, a direct-current voltage (first bias voltage) is supplied to the bases of the bipolar transistors 11a and 11b through the bias supply terminal 94. The first bias voltage is, for example, 2.5 V. With such a configuration, the voltage change in the collectors of the bipolar transistors 10a and 10b is suppressed, and the mirror effect of the base-collector capacitance of the bipolar transistors 10a and 10b is suppressed. Therefore, the driving circuit 100 can have a wide operating band. Further, since the output resistance of the driving circuit 100 increases due to the presence of the bipolar transistors 11a and 11b, the voltage gain of the driving circuit 100 can be improved. The bipolar transistors 11a and 11b may be replaced with, for example, n-type MOS transistors. In the circuit diagram shown in FIG. 3, the bipolar transistors 11a and 11b are arranged symmetrically on the high potential side of the pair of bipolar transistors 10a and 10b, and operate complementarily to each other, so the electrical characteristics of the bipolar transistor 11a are preferably equal to the electrical characteristics of the bipolar transistor 11b.

In the bipolar transistor (fifth transistor) 12a, a base (fifth control terminal) is connected to the bias circuit 80, an emitter (fifth outflow terminal) is connected to the other end of the inductor 40a, and a collector (fifth inflow terminal) is connected to the output signal terminal 92a via the inductor 41a. In the bipolar transistor (sixth transistor) 12b, a base (sixth control terminal) is connected to the bias circuit 80, an emitter (sixth outflow terminal) is connected to the other end of the inductor 40b, and a collector (sixth inflow terminal) is connected to the output signal terminal 92b via the inductor 41b. These bipolar transistors 12a and 12b are, for example, cascode transistors. However, a bias is supplied from the bias circuit 80 to the bases of the bipolar transistors 12a and 12b. In the circuit diagram shown in FIG. 3, the bipolar transistors 12a and 12b are disposed symmetrically on the high potential side of the pair of bipolar transistors 11a and 11b, and operate complementarily to each other, so that it is desirable that the electrical characteristics of the bipolar transistor 12a is equal to the electrical characteristics of the bipolar transistor 12b.

One end of the resistor 20a is connected to the emitter of the bipolar transistor 10a, and the other end thereof is connected to a collector of the bipolar transistor 13. One end of the resistor 20b is connected to the emitter of the bipolar transistor 10b, and the other end thereof is connected to the collector of the bipolar transistor 13. These resistors 20a and 20b are degeneration resistors and enable the linear input range of the driving circuit 100 to be expanded. For example, when the resistance values of the resistors 20a and 20b are increased, the linear input range is expanded. The resistors 20a and 20b are, for example, n-type poly-Si resistors. When the linear input range of the driving circuit 100 is sufficiently wider than the use range, the resistors 20a and 20b may be omitted.

In the bipolar transistor 13, its collector is connected to the other ends of the resistors 20a and 20b, its base is connected to the bias supply terminal 93, and its emitter is connected to the ground line 70a which is set to the ground potential (power supply potential). The bipolar transistor 13 functions as a current source that supplies a constant current to the pair of transistors 10a and 10b. The current value of the constant current can be adjusted by adjusting the voltage value input to the bias supply terminal 93. Since the emitters of the bipolar transistors 10a and 10b are connected to the ground line 70a via the bipolar transistor 13, the current supplied by the bipolar transistor 13 is equal to the sum of an emitter current of the bipolar transistor 10a and an emitter current of the bipolar transistor 10b. For example, a current corresponding to the bias voltage of the bias supply terminal 93 is generated by the bipolar transistor 13, and the current value is, for example, 60 mA. The bias supply terminal 93 may be configured to be applied with a base voltage of another diode-connected bipolar transistor. In this case, a current mirror is formed, and the amount of current generated by the bipolar transistor 13 can be easily adjusted. Instead of the bipolar transistor 13, a MOS transistor may be used. Instead of the bipolar transistor 13, a resistor or a circuit including a resistor and an inductor may be used.

The bias circuit 80 has a function of supplying a DC bias (second bias voltage) to each of the bases of the pair of bipolar transistors 12a and 12b and setting the voltage amplitudes of the bases. The resistor (first resistor) 22a is connected between the collector and the base of the bipolar transistor 12a. The resistor (first resistor) 22b is connected between the collector and the base of the bipolar transistor 12b. The resistor (second resistor) 21a is connected between the base of the bipolar transistor 12a and a connection node 95. The resistor (second resistor) 21b is connected between the base of the bipolar transistor 12b and the connection node 95. The current source (power supply circuit) 50 is connected between the connection node 95 and the ground line 70b set to the ground potential, and generates a constant current. The capacitor 31a is connected between the base of the bipolar transistor 12a and the connection node 95. The capacitor 31b is connected between the base of the bipolar transistor 12b and the connection node 95.

Here, it is preferable that the resistor 21a and the resistor 21b have substantially the same resistance value, and the resistor 22a and the resistor 22b have substantially the same resistance value. In this case, a voltage lower than the voltage of the collector of the bipolar transistor 12a by a voltage drop determined by the "resistance value of the resistor 22a" and the "half of the value of the current generated by the current source 50" is generated at the base of the bipolar transistor 12a. Further, a voltage lower than the voltage of the collector of the bipolar transistor 12b by a voltage drop determined by the "resistance value of the resistor 22b" and the "half of the value of the current generated by the current source 50" is generated at the base of the bipolar transistor 12b. Further, a voltage lower than the voltage of the base of the bipolar transistor 12a by a voltage drop determined by the "resistance value of the resistor 21a" and the "half of the value of the current generated by the current source 50" is generated at the connection node 95. Similarly, a voltage lower than the voltage of the base of the bipolar transistor 12b by a voltage drop determined by the "resistance value of the resistor 21b" and the "half of the value of the current generated by the current source 50" is generated at the connection node 95. In order to prevent avalanche breakdown in the collector-base junction due to an increase in the collector voltages of the bipolar transistors 12a and 12b, the resistance values of the resistors 21a, 21b, 22a, and 22b are desirably sufficiently lower than base resistances of the bipolar transistors 12a and 12b, and are 200Ω for each, for example. In addition, it is preferable that capacitances of the capacitor 31a and the capacitor 31b are substantially equal to each other, and for example, the capacitances are 50 fF. Note that, regarding two or more values of the resistance value or the capacitance, "substantially equal" means that the values may be different from each other within an allowable range. For example, the allowable range is a relative error of 5% or less.

The pair of bipolar transistors 12a and 12b and the pair of bipolar transistors 11a and 11b operate as follows by the action of the bias circuit 80 having the above-described configuration. In the following description, it is assumed that the output signal terminals 92a and 92b are connected to an external load 102 as shown in FIG. 3, and that differential voltage signal is generated at the output signal terminals 92a and 92b in response to output differential current signals.

First, at the connection node 95, a direct-current voltage (DC voltage) is generated which is lower than an intermediate voltage between the voltage signal at the collector of the bipolar transistor 12a and the voltage signal at the collector of the bipolar transistor 12b which constitute a differential signal by the voltage drop described above.

Accordingly, in a low frequency band (for example, a band equal to or lower than 1 GHz), the amplitude (voltage amplitude) of the voltage signal of the base of the bipolar transistor 12a is set to a value obtained by dividing the amplitude (voltage amplitude) of the voltage signal of the collector of the bipolar transistor 12a by the resistor 21a and the resistor 22a. In a low frequency band (for example, a band equal to or lower than 1 GHz), the voltage amplitude of the base of the bipolar transistor 12b is set to a value obtained by dividing the voltage amplitude of the collector of the bipolar transistor 12b by the resistor 21b and the resistor 22b. In the present embodiment, for example, the resistance value of the resistor 21a is equal to the resistance value of the resistor 22a, and the resistance value of the resistor 21b is equal to the resistance value of the resistor 22b. Therefore, in the low frequency band, the voltage amplitude of the base of the bipolar transistor 12a is set to about half of the voltage amplitude of the collector of the bipolar transistor 12a. In the low frequency band, the voltage amplitude of the base of the bipolar transistor 12b is set to about half the voltage amplitude of the collector of the bipolar transistor 12b.

On the other hand, in a high frequency band (for example, a band equal to or higher than 1 GHz), the voltage amplitude of the base of the bipolar transistor 12a is set to a value obtained by dividing the voltage amplitude of the collector of the bipolar transistor 12a by the collector-base capacitance of the bipolar transistor 12a and the capacitance of the capacitor 31a. The voltage amplitude of the base of the bipolar transistor 12b is set to a value obtained by dividing the voltage amplitude of the collector of the bipolar transistor 12b by the collector-base capacitance of the bipolar transistor 12b and the capacitance of the capacitor 31b. In this embodiment, for example, the capacitance of the capacitor 31a is set to be substantially equal to the collector-base capacitance of the bipolar transistor 12a. For example, the capacitance of the capacitor 31b is set to be substantially equal to the collector-base capacitance of the bipolar transistor 12b. Therefore, the voltage amplitude of the base of the bipolar transistor 12a is set to about half the voltage amplitude of the collector of the bipolar transistor 12a. The voltage amplitude of the base of the bipolar transistor 12b is set to about half the voltage amplitude of the collector of the bipolar transistor 12b. The capacitances of the capacitors 31a and 31b are preferably adjusted in accordance with parasitic capacitances generated in the resistors 21a, 21b, 22a, and 22b. In addition, when the parasitic capacitance between the bases of the bipolar transistors 12a and 12b and the ground potential is large, the capacitors 31a and 31b may be omitted.

As described above, in a wide range of frequencies from the low frequency band to the high frequency band, the voltage amplitude of the base of the bipolar transistor 12a is set to substantially half the voltage amplitude of the collector of the bipolar transistor 12a. Further, the voltage amplitude of the base of the bipolar transistor 12b is set to substantially half the voltage amplitude of the collector of the bipolar transistor 12b. In a bipolar transistor having a large transconductance (gm), the potential variation of the emitter is substantially equal to the potential variation of the base. Therefore, the voltage amplitude of the emitter of the bipolar transistor 12a is also suppressed to approximately half of the voltage amplitude of the collector of the bipolar transistor 12a. Further, the voltage amplitude of the emitter of the bipolar transistors 12b is also suppressed to substantially half the voltage amplitude of the collector of the bipolar transistor 12b. As a result, the collector-emitter voltage amplitudes of the bipolar transistors 12a and 12b become substantially half of the voltage amplitudes of the respective collectors.

On the other hand, as described above, a DC voltage is applied to the bases of the pair of bipolar transistors 11a and 11b. Accordingly, the voltage amplitudes of the emitters of the pair of bipolar transistors 11a and 11b are suppressed to be small, and as a result, the respective voltage amplitudes between the collectors and the emitters of the pair of bipolar transistors 11a and 11b are substantially equal to the voltage amplitudes at the respective collectors.

In this way, in a wide range of frequencies from the low frequency band to the high frequency band, the voltage amplitude of the collector of the bipolar transistor 12a is divided by the collector-emitter voltage of the bipolar transistor 12a and the collector-emitter voltage of the bipolar transistor 11a. The voltage amplitude of the collector of the bipolar transistor 12b is divided by the collector-emitter voltage of the bipolar transistor 12b and the collector-emitter voltage of the bipolar transistor 11b.

Note that the base voltages of the pair of bipolar transistors 12a and 12b are not constant, but vary according to changes in the collector voltages of the pair of bipolar transistors 12a and 12b. Therefore, the bipolar transistors 12a and 12b are referred to as dynamic cascode transistors. On the other hand, the base potentials voltages of the pair of bipolar transistors 11a and 11b are constant except for noise components. Therefore, the bipolar transistors 11a and 11b are referred to as static cascode transistors.

The inductor (first inductor) 40a is connected between the collector of the bipolar transistor 11a and the emitter of the bipolar transistor 12a. The inductor (second inductor) 40b is connected between the collector of the bipolar transistor 11b and the emitter of the bipolar transistor 12b. The inductor (third inductor) 41a is connected between the collector of the bipolar transistor 12a and the output signal terminal 92a. The inductor (fourth inductor) 41b is connected between the collector of the bipolar transistor 12b and the output signal terminal 92b. The inductance of the inductor 41a is greater than the inductance of the inductor 40a, and the inductance of the inductor 41b is greater than the inductance of the inductor 40b. In addition, it is preferable that the inductor 41a and the inductor 41b have substantially the same inductance (second inductance), and it is preferable that the inductor 40a and the inductor 40b have substantially the same inductance (first inductance). For example, the first inductance is 50 pH and the second inductance is 150 pH. The first inductor is preferably equal to or greater than 10 pH, for example. The first inductor is more preferably equal to or greater than 20 pH. The pair of inductors 40a and 40b and the pair of inductors 41a and 41b are inductors for causing peaking in a high-frequency region in frequency characteristics of signal gains. The inductors 40a, 40b, 41a, and 41b improve the signal gain in the high-frequency region of the driving circuit 100, thereby making it possible to widen the band of the signal gain. As the inductors 40a, 40b, 41a, and 41b, spiral inductors in which signal lines are laid out (formed) in spiral shapes on a semiconductor chip can be used. In the circuit diagram shown in FIG. 3, since the inductors 40a and 40b are arranged symmetrically on the high potential side of the pair of bipolar transistors 11a and 11b and operate complementarily to each other, it is desirable that the line width of the signal wiring forming the inductor 40b is equal to the line width of the signal wiring forming the inductor 40a. Further, it is desirable that the line width of the signal wiring forming the inductor 41b is equal to the line width of the signal wiring forming the inductor 41a.

The driving circuit 100 including the bias circuit 80 of above configuration includes the pair of bipolar transistors 10a and 10b. For example, the base of the bipolar transistor 10a is connected to the input signal terminal 91a, and the base of the bipolar transistor 10b is connected to the input signal terminal 91b. The bipolar transistors 10a and 10b are connected in parallel with each other between the "pair of output signal terminals 92a and 92b" and the ground line 70a. The driving circuit 100 functions as a differential amplifier circuit that amplifies a differential signal input to the pair of input signal terminals 91a and 91b and outputs the amplified differential signal as a differential current signal to the pair of output signal terminals 92a and 92b. More specifically, the differential signal includes a positive-phase signal and a negative-phase signal, and the input signal terminal 91a receives the positive-phase signal, while the input signal terminal 91b receives the negative-phase signal, for example. The differential current signal includes a positive-phase current signal and a negative-phase current signal, and the output signal terminal 92a outputs the positive-phase current signal, while the output signal terminal 92b outputs the negative-phase current signal. Here, the driving circuit 100 is called an open collector circuit because the collectors of the bipolar transistors 12a and 12b are connected to the output signal terminals 92a and 92b without being terminated when the external load 102 is not connected, that is, without being connected to an internal power supply or without being grounded via an internal resistor (for example, a resistor inside the IC in which the driving circuit 100 is mounted). When the bipolar transistors 12a and 12b are replaced with MOS transistors, the driving circuit 100 is called an open drain circuit.

Figure 3:
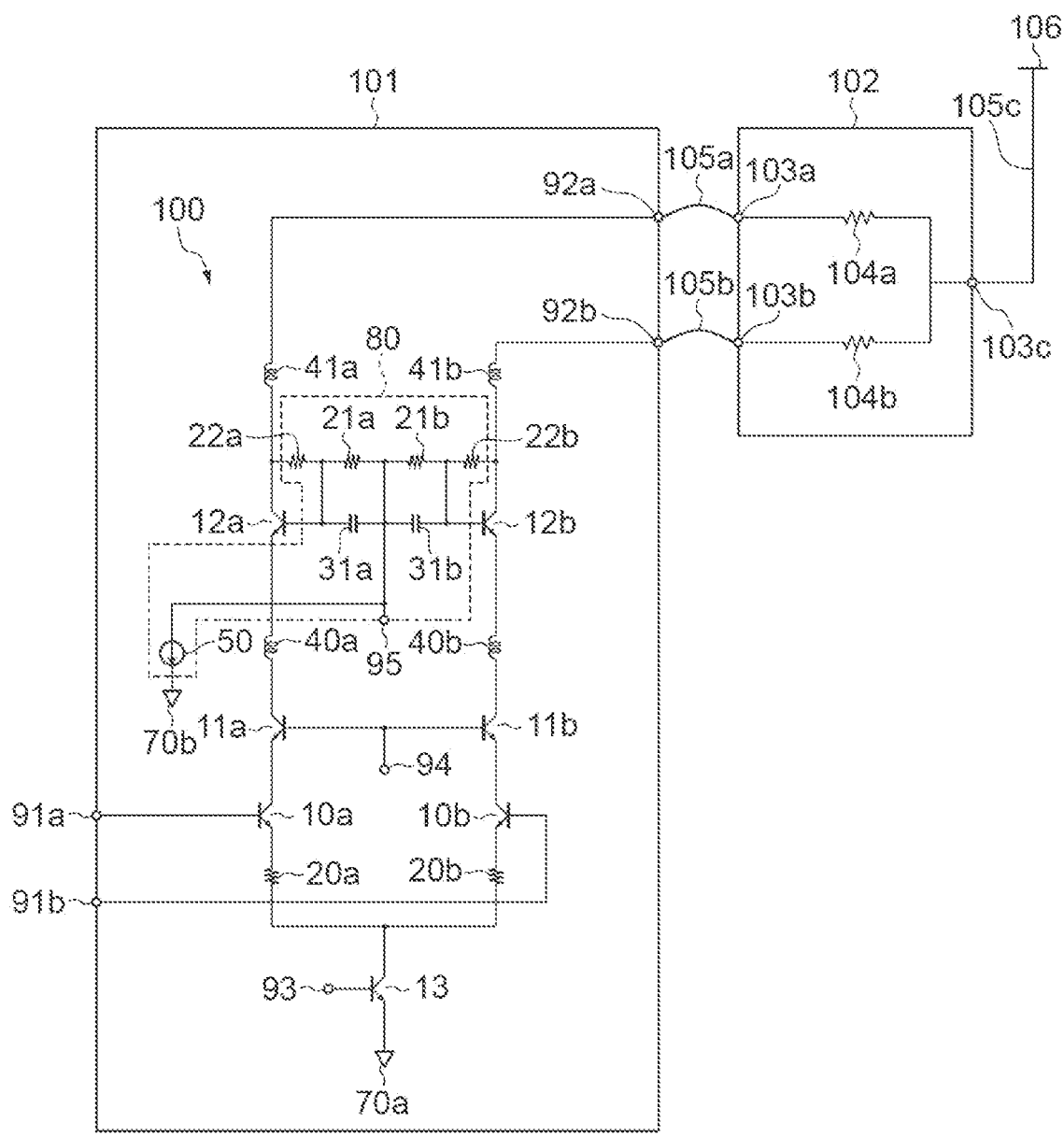
FIG. 3 is a circuit diagram showing a state in which the driving circuit 100 of FIG. 2 is connected to an external load.

FIG. 3 shows a configuration in which the driving circuit 100 is connected to an external load. FIG. 3 shows, for example, an IC 101 is mounted on a communication apparatus. As shown in FIG. 3, in the driving circuit 100 mounted on the IC 101, the output signal terminals 92a and 92b are connected to the external load 102 to which a predetermined voltage (for example, 5.0 V) is applied by an external power supply 106. That is, the pair of output signal terminals 92a and 92b are connected to connection terminals 103a and 103b of the external load 102 via electric wirings 105a and 105b, respectively. The external load 102 has load resistances 104a, 104b each having a predetermined resistance value (for example, 30Ω) between two connection terminals 103a, 103b and a connection terminal 103c, and the connection terminal 103c is connected to the external power supply 106 via an electric wiring 105c. Thus, the output signal terminal 92a is terminated by the external power supply 106 via the load resistance 104a, and the output signal terminal 92b is terminated by the external power supply 106 via the load resistance 104b. With this connection configuration, the voltage values of the differential signal at the output signal terminals 104a and 104b are determined by the voltage of the external power supply 106, the resistance values of the load resistances 104a and 104b, the parasitic resistances, the parasitic capacitances, and the parasitic inductances of the electric wirings 105a and 105b, and the output currents of the driving circuit 100. In other words, the differential current signal output from the pair of output signal terminals 92a and 92b is converted into a differential voltage signal by the load resistances 104a and 104b. More specifically, a positive-phase voltage signal of the differential voltage signal is generated by the load resistance 104b, and a negative-phase voltage signal of the differential voltage signal is generated by the load resistance 104a, for example. The positive-phase voltage signal and the negative-phase voltage signal are a pair of complementary signals and constitute the differential voltage signal. For example, when the positive phase voltage signal increases, the negative phase voltage signal decreases, and when the positive phase voltage signal decreases, the negative phase voltage signal increases. The negative phase voltage signal has a phase opposite to the phase of the positive phase voltage signal. For example, when the positive phase voltage signal reaches the maximum value (peak voltage), the negative phase voltage signal reaches the minimum value (bottom voltage), and when the positive phase voltage signal reaches the minimum value (bottom voltage), the negative phase voltage signal reaches the maximum value (peak voltage). The negative phase voltage signal preferably has the same amplitude as the amplitude of the positive phase voltage signal. Preferably, the negative phase voltage signal has the same average voltage value (DC component) as the average voltage value (DC component) of the positive phase voltage signal.

An amplifying operation by the driving circuit 100 having the above-described configuration will be described.

The pair of bipolar transistors 10a and 10b change the collector currents output from the pair of bipolar transistors 10a and 10b in accordance with the voltage signal (differential signal) input to the pair of input signal terminals 91a and 91b. The collector current output from the bipolar transistor 10a passes through the bipolar transistor 11a, the inductor 40a, the bipolar transistor 12a, and the inductor 41a, and is output from the output signal terminal 92a. The collector current output from the bipolar transistor 10b passes through the bipolar transistor 11b, the inductor 40b, the bipolar transistor 12b, and the inductor 41b, and is output from the output signal terminal 92b. The voltage gains of the differential voltage signal at the output signal terminals 92a and 92b with respect to the differential signal are frequency-dependent. In particular, a large voltage gain (peaking) can be obtained at a resonance frequency mainly determined by the inductances (second inductances) of the pair of inductors 41a and 41b, the capacitance components generated at both ends of each of the inductors 41a and 41b, and the resistance value of the external load.

Figure 4:
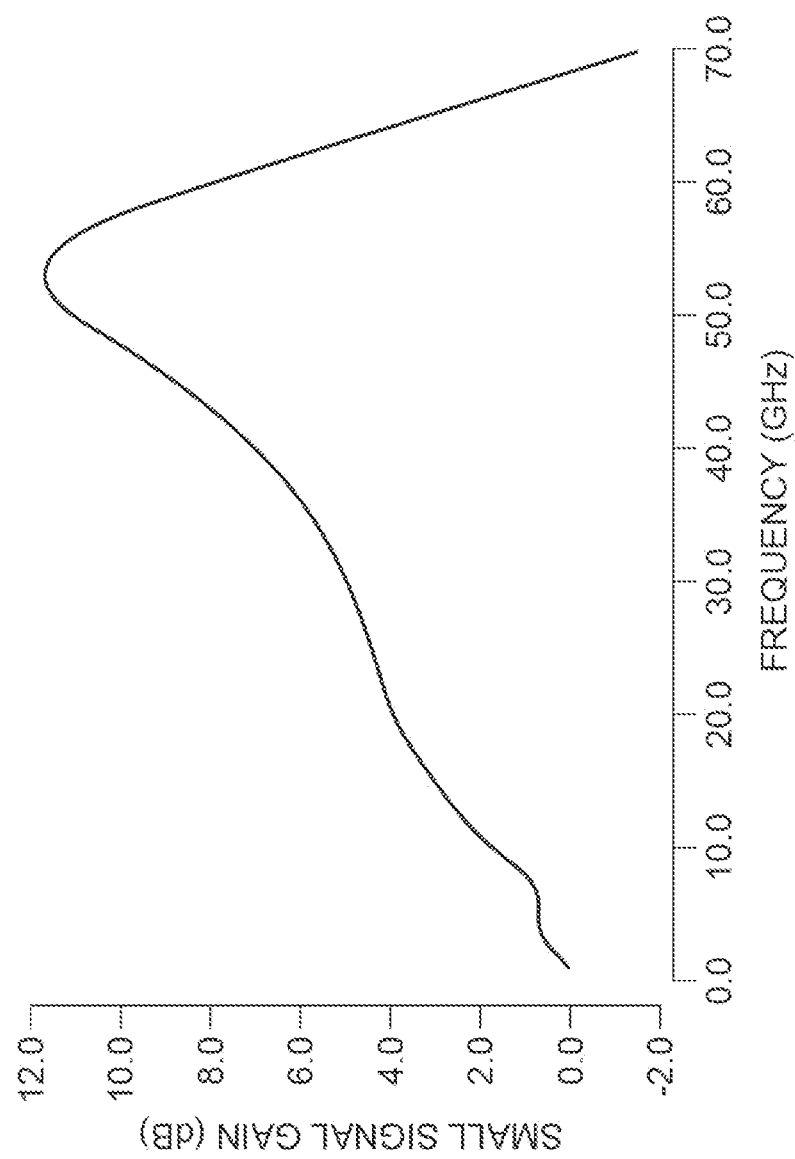
FIG. 4 is a graph showing a frequency characteristics of small-signal gain at output signal terminals 92a and 92b of FIG. 2.

FIG. 4 is a graph showing a frequency characteristics of the small-signal gain (voltage gain) of the differential voltage signal at the output signal terminals 92a and 92b. From this result, it is understood that the voltage gain at 50 GHz is about 11 dB, that is, 3.5 times as large as the voltage gain at 1 GHz. This means that if the amplitude of the input differential signal is constant with respect to frequencies and the amplitude of the differential voltage signal at 1 GHz is, for example, 1.7 V, the amplitude of the differential voltage signal at 50 GHz becomes 6.0 V.

In the example of the small signal gain described above, when the amplitude of the differential voltage signal is 6.0 V, the voltage amplitudes of the collectors of the pair of bipolar transistors 12a and 12b are half the amplitudes of the differential voltage signal, and thus 3.0 V. In the case of the configuration not including the bipolar transistors 12a and 12b, since the bipolar transistors 11a and 11b are static cascode transistors, a voltage signal having this voltage amplitude is applied between the respective collectors and emitters of the pair of bipolar transistors 11a and 11b. As a result, after the driving circuit 100 has been used for a long period of time (for example, 10 years or more), the base currents of the bipolar transistors 11a and 11b increase due to aging degradation, and there is a possibility that the gains of the bipolar transistors 11a and 11b decrease or high-frequency performance (current-gain cut-off frequencies, maximum oscillation frequencies, etc.) deteriorates.

In the present embodiment, since the bipolar transistors 12a and 12b, which are dynamic cascode transistors, are provided, the voltage amplitudes between the respective emitters and collectors of the pair of bipolar transistors 12a and 12b are substantially half (1.5 V according to the above numerical example) of the voltage amplitudes at the respective collectors. The collector-emitter voltage amplitudes of the bipolar transistors 11a and 11b, which are static cascode transistors, are substantially equal to the voltage amplitudes at the collectors of the bipolar transistors 11a and 11b. Thus, the voltage amplitude at the collector of the bipolar transistor 12a is divided by the bipolar transistor 12a and the bipolar transistor 11a. Further, the voltage amplitude at the collector of the bipolar transistor 12b is divided by the bipolar transistor 12b and the bipolar transistor 11b. As a result, the possibility of deterioration of the bipolar transistors 12a and 12b and the bipolar transistors 11a and 11b can be reduced.

Next, effects of the pair of inductors 40a, 40b provided between the pair of bipolar transistors 12a, 12b and the pair of bipolar transistors 11a, 11b will be described.

Figure 5A:
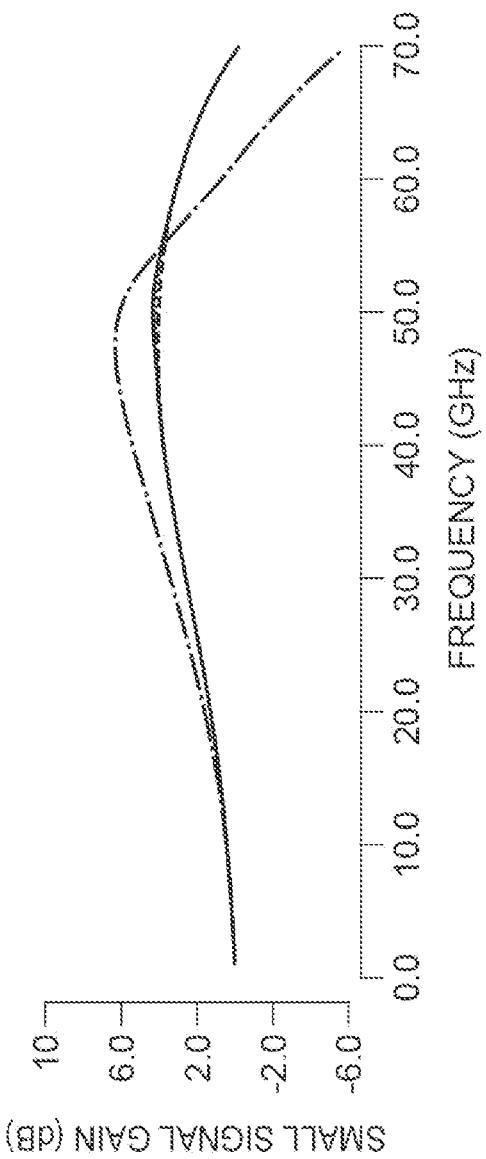
FIG. 5A is a graph showing a frequency characteristics of small-signal gains of the semiconductor integrated circuit 200 shown in FIG. 1.
Figure 5B:
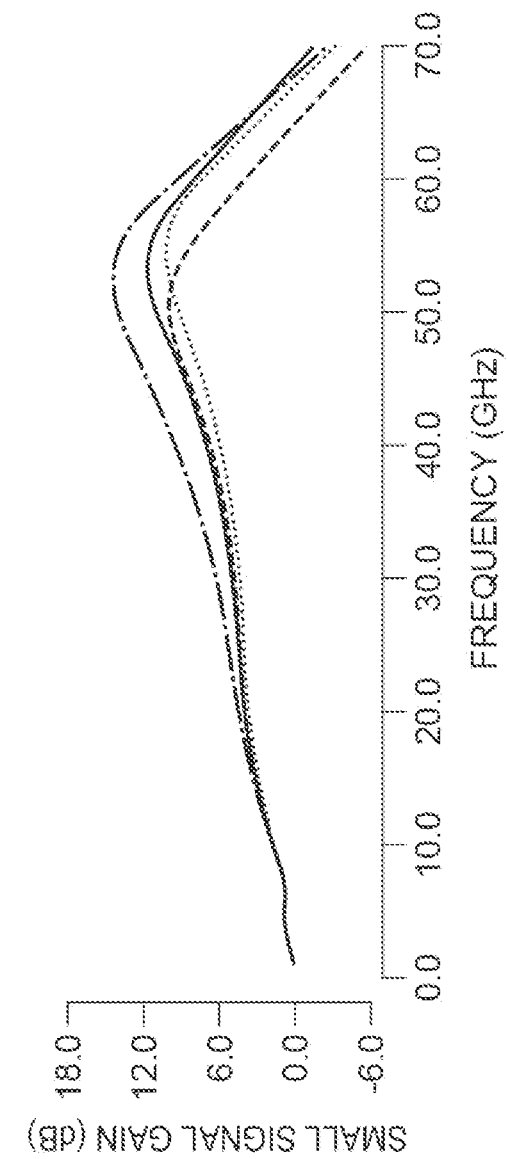
FIG. 5B is a graph showing a frequency characteristics of small-signal gains of the semiconductor integrated circuit 200 shown in FIG. 1.

FIG. 5A and FIG. 5B are graphs showing frequency characteristics of the small-signal gain of the semiconductor integrated circuit 200 which consists of the driving circuit 100 and the input circuit 110 serving as a pre-buffer. FIG. 5A shows the small-signal gains of the differential signal at the input signal terminals 91a, 91b of the driving circuit 100, and FIG. 5B shows the small-signal gains of the differential voltage signal at the output signal terminals 92a, 92b of the driving circuit 100. In FIG. 5A and FIG. 5B, graphs GA represent gains in the case where the inductors 40a, 40b are excluded, graphs GB represent gains in the configuration of the present embodiment, graphs GC represent gains in the case where the positions of the "inductors 40a, 40b" are changed to positions between the "bipolar transistors 12a, 12b" and the "inductors 41a, 41b", and graphs GD represent gains in the case where the "inductors 40a, 40b" are inserted between the pair of bipolar transistors 10a, 10b and bipolar transistors 11a, 11b.

As can be seen from these results, the small-signal gain at the output signal terminals 92a and 92b (graph GB in FIG. 5B) of the present embodiment is more improved than that in the case where the inductors 40a and 40b are excluded (graph GA in FIG. 5B). On the other hand, the small signal gain in the input signal terminals 91a and 91b (graph GB in FIG. 5A) of the present embodiment is almost the same as that in the case where the inductors 40a and 40b are excluded (graph GA).

When the pair of inductors 40a, 40b are inserted between the pair of bipolar transistors 12a, 12b and the pair of inductors 41a, 41b, the small-signal gain of the differential voltage signal at the output signal terminals 92a, 92b (graph GC in FIG. 5B) increases at 50 GHz compared to that in the case where the inductors 40a and 40b are excluded (graph GA in FIG. 5B) but the peak frequency decreases, and the effect of peaking (a phenomenon in which the gain shows a peak value before the gain decreases with frequency in a high frequency region) is smaller compared to the present embodiment (graph GB in FIG. 5B). In this case, the small-signal gain (graph GC in FIG. 5A) in the differential signal at the input signal terminals 91a and 91b are almost the same as that in the present embodiment (graph GB in FIG. 5A). The configuration in which the pair of inductors 40a, 40b are connected between the pair of bipolar transistors 12a, 12b and the pair of inductors 41a, 41b means a configuration in which each of the inductors 40a and 40b are connected in series with the respective inductors 41a and 41b. This configuration is equivalent to increasing the inductance of each of the inductors 41a and 41b in accordance with the inductance of each of the inductors 40a and 40b without using the inductors 40a and 40b. By this configuration, it is considered that the resonance frequency (the peak frequency) decreases. On the other hand, in the case of the configuration of the present embodiment, by the bipolar transistors 12a and 12b which are dynamic cascode transistors, electromotive forces generated in the inductors 40a and 40b are doubled and output to each of the collector sides of the bipolar transistors 12a and 12b. Further, in this embodiment (graph GB of FIG. 5B), electromotive forces of the inductors 41a and 41b are added to the electromotive forces generated in the inductor 41a and 41b, and are output. As a result, a large peaking can be obtained as compared with the case where only the inductors 41a and 41b are used (graph GA of FIG. 5B).

When the pair of inductors 40a, 40b are inserted between the pair of bipolar transistors 10a, 10b and the pair of bipolar transistors 11a, 11b, the peaking of the small signal gain (graph GD of FIG. 5B) at the output signal terminals 92a, 92b is larger than that of the present embodiment (graph GB of FIG. 5B). On the other hand, the small signal gain (graph GD in FIG. 5A) at the input signal terminals 91a, 91b of this case changes greatly, and a decrease in peak frequency and an increase in peak height are observed. It is considered that this is because the voltage amplitudes of the respective collectors of the bipolar transistors 10a and 10b are increased by the inductors 40a and 40b to increase the mirror effect of the base-collector capacitance, and as a result, the input impedances of the bipolar transistors 10a and 10b are changed. In case the small signal gain at the input signal terminals 91a and 91b increases in this manner, the input amplitude of the driving circuit 100 increases, and there is a possibility that the linearity of the signal amplification operation of the driving circuit 100 deteriorates when a large signal is input, owing to exceeding of the linear input range of the driving circuit 100. As a result, an SNR (Signal to Noise Ratio) of the driving circuit 100 is deteriorated, so that an increase in peaking at the input signal terminals 91a and the 91b is not preferable.

According to the above description, the insertion positions of the pair of inductors 40a and 40b on the circuit in the configuration of the present embodiment are effective from the viewpoint of achieving both improvement in linearity and widening of the band in the signal amplification operation.

Here, in the configuration of the present embodiment, by inserting the pair of inductors 40a and 40b, the voltage amplitudes of the collectors of the pair of bipolar transistors 11a and 11b increase. As a result, the ratio between the collector-emitter voltage amplitudes of the pair of bipolar transistors 12a and 12b and the collector-emitter voltage amplitudes of the pair of bipolar transistors 11a and 11b changes, and the collector-emitter voltage amplitudes of the pair of bipolar transistors 11a and 11b become larger. Therefore, in this embodiment, the capacitances of the capacitors 31a and 31b are increased as compared with the case where the inductors 40a and 40b are not provided. Accordingly, the voltage amplitudes of the bases and the voltage amplitudes of the emitters of the pair of bipolar transistors 12a and 12b decrease, and the collector-emitter voltage amplitudes of the pair of bipolar transistors 12a and 12b increase, so that the ratio of the collector-emitter voltage amplitudes of both becomes equal again. At this time, as described above, since the voltage amplitudes of the bases and the voltage amplitudes of the emitters of the pair of bipolar transistors 12a and 12b decrease, the capacitances seen from the collectors of the pair of bipolar transistors 12a and 12b decrease. As a result, the driving circuit 100 can have a wider operating band.

If the inductances of the inductors 40a and 40b are too large, the current amplitudes increase, the minimum collector current of the pair of bipolar transistors 12a and 12b reaches to zero, and the linearity may deteriorate (the polarity of the collector current is positive in the direction from the collector toward the emitter). Therefore, in the present embodiment, the inductances of the pair of inductors 40a and 40b is set to be smaller than the inductance of the pair of inductors 41a and 41b. For example, it is desirable that the inductance of the inductors 40a and 40b is equal to or less than half the inductance of the inductors 41a and 41b.

Figure 6:
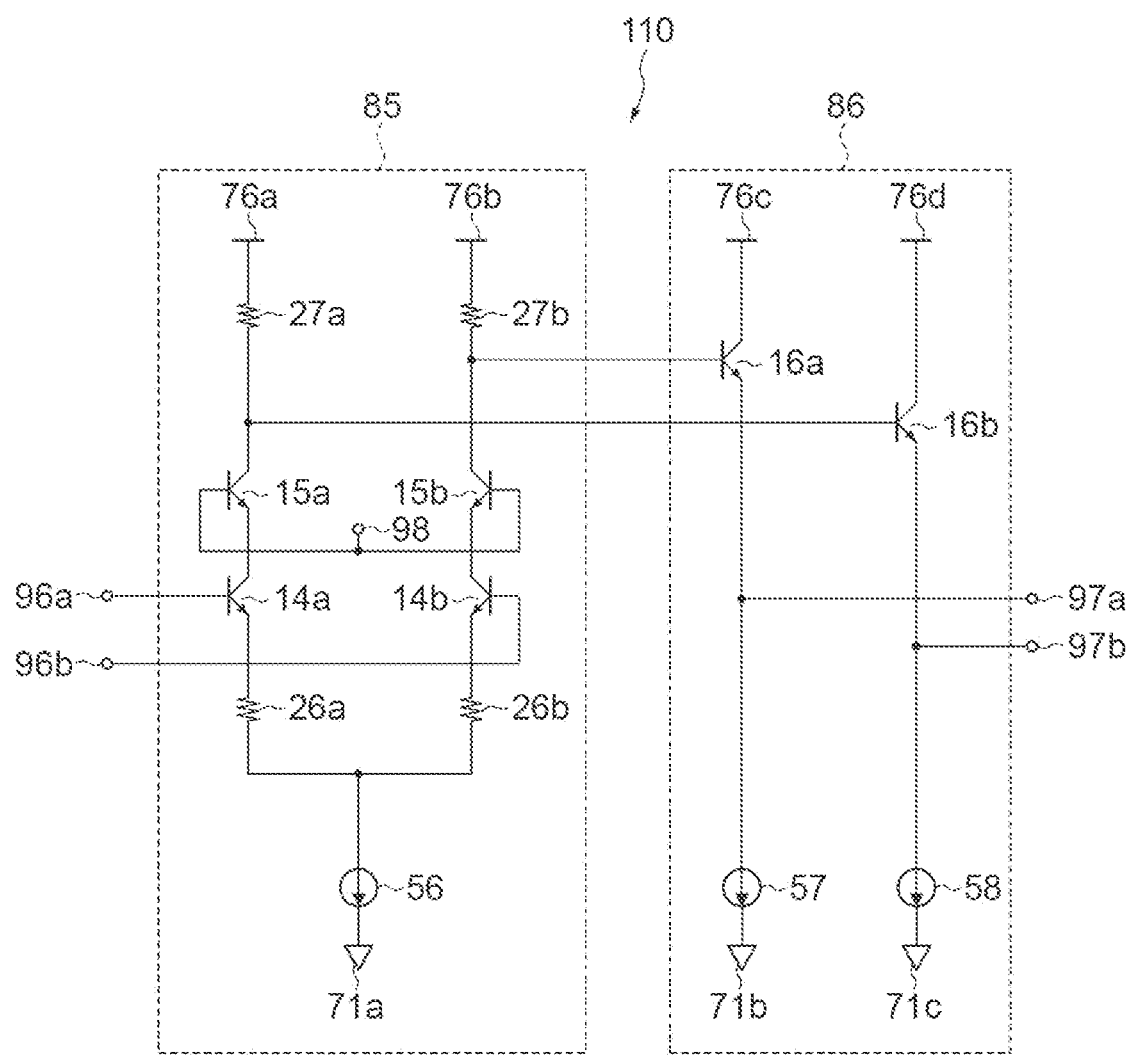
FIG. 6 is a circuit diagram showing a configuration of an input circuit 110 shown in FIG. 1.

Next, a configuration example of the input circuit 110 included in the semiconductor integrated circuit 200 will be described with reference to FIG. 6. FIG. 6 is a circuit diagram showing the configuration of the input circuit 110. The input circuit 110 includes the input terminals 96a, 96b connected to input terminals 130a, 130b, output terminals 97a, 97b connected to the input signal terminals 91a, 91b of the driving circuit 100, a differential amplifier 85, and an emitter follower 86.

The differential amplifier 85 includes bipolar transistors 14a, 14b, 15a, 15b, resistors 26a, 26b, 27a, 27b, and a current source 56. Each base of the bipolar transistors 14a and 14b is connected to the input terminals 96a and 96b, each collector thereof is connected to emitters of the bipolar transistors 15a and 15b, and each emitter thereof is connected to one end of the current source 56 via the resistors 26a and 26b. The bipolar transistors 14a and 14b change their collector currents in accordance with input signals which constitute a differential signal. Each base of the bipolar transistors 15a and 15b is connected to a bias supply terminal 98 set to a predetermined DC voltage, each of the emitters thereof is connected to the collectors of the bipolar transistors 14a and 14b, and each collector thereof is connected to power source lines 76a and 76b having a predetermined power source potential (for example, 3.3 V) via the resistors 27a and 27b. These bipolar transistors 15a and 15b are static cascode transistors whose bases are applied with a DC voltage. The resistors 26a and 26b are degeneration resistors that enable expansion of the linear input range of the input circuit 110. One end of the current source 56 is connected to the emitters of the bipolar transistors 14a and 14b via the resistors 26a and 26b, and the other end thereof is connected to a ground line 71a set to the ground potential. The current source 56 supplies the emitter currents of the bipolar transistors 14a and 14b. The resistors 27a and 27b are loads for converting collector currents modulated by the bipolar transistors 14a and 14b into voltage signals. According to the differential amplifier 85 having such a configuration, each of the collector currents of the bipolar transistors 14a and 14b changes in accordance with the input signals that constitute the differential signal input at the input terminals 96a and 96b, so that a pair of output signals (positive-phase signal and negative-phase signal) that constitute a differential signal are output from the collectors of the bipolar transistors 15a and 15b.

The emitter follower 86 includes bipolar transistors 16a and 16b and current sources 57 and 58. Each base of the bipolar transistors 16a and 16b is connected to the collectors of the bipolar transistors 15a and 15b, each collector thereof is connected to power source lines 76c and 76d having a predetermined power source potential, and each emitter thereof is connected both to the output terminals 97a and 97b and to one end of the current sources 57 and 58. These bipolar transistors 16a and 16b generate signals following the pair of output signals of the differential amplifier 85, and output them from the output terminals 97a and 97b, respectively. One ends of the current sources 57 and 58 are connected to the emitters of the bipolar transistors 16a and 16b, respectively, and the other ends thereof are connected to ground lines 71b and 71c each having the ground potential, respectively. The current sources 57 and 58 supply the emitter currents of the bipolar transistors 16a and 16b. The emitter follower 86 outputs a pair of output signals following the pair of output signals of the differential amplifier 85 with low output impedance from the output terminals 97a and 97b.

Figure 7:
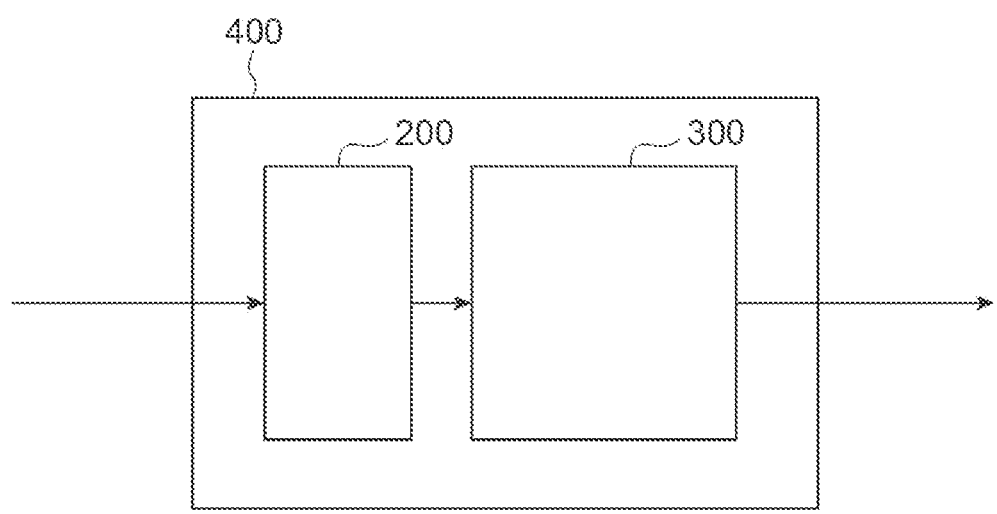
FIG. 7 is a block diagram showing a configuration of an optical transmitter module 400 according to an embodiment.

FIG. 7 shows a configuration of an optical transmitter module 400 according to the embodiment. The optical transmitter module 400 includes the semiconductor integrated circuit 200 and an optical modulator 300. The semiconductor integrated circuit 200 amplifies, for example, four input differential signal, and outputs them. The optical modulator 300 generates an optical signal modulated based on the four differential signal output from the semiconductor integrated circuit 200, and outputs, for example, one optical signal subjected to polarization multiplexing QAM (Quadrature Amplitude Modulation). Alternatively, the optical modulator 300 may generate four optical signals having different peak wavelengths based on the four differential signals. For example, the optical modulator 300 outputs four optical signals subjected to PAM modulation. In this case, the optical transmitter module 400 may further include an optical multiplexer, and the optical multiplexer may multiplex the four optical signals to generate and output one wavelength division multiplexed signal. The optical transmitter module 400 is, for example, an optical module in which the semiconductor integrated circuit 200 and the optical modulator 300 are integrated and mounted in a ceramic package, and has an outer shape of, for example, 30 mm×15 mm×5 mm. According to the optical transmitter module 400 having the above-described configuration, since the semiconductor integrated circuit 200 on which the driving circuit 100 is mounted is used, a broadband optical transmitter module capable of generating an optical signal having good waveform quality is realized.

Figure 8:
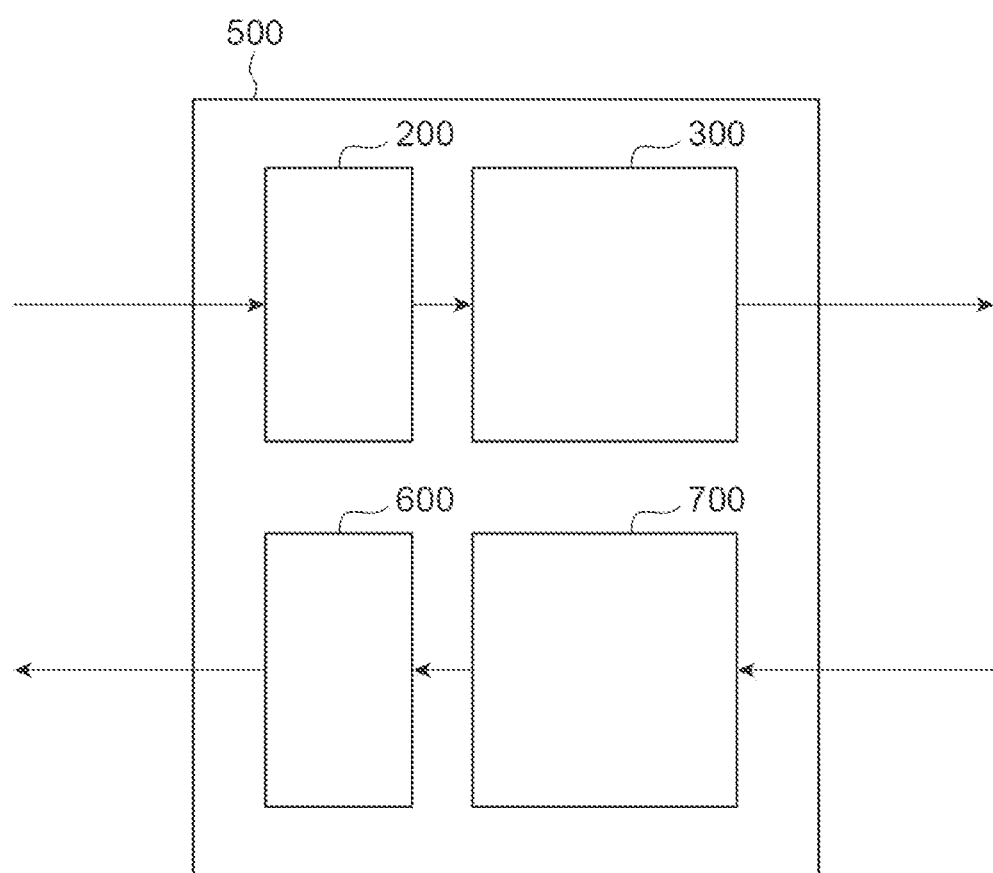
FIG. 8 is a block diagram showing a configuration of an optical transceiver module 500 according to an embodiment.

FIG. 8 shows the configuration of an optical transceiver module 500 according to the embodiment. The optical transceiver module 500 includes a receiver circuit 600 and an optical receiver 700 in addition to the semiconductor integrated circuit 200 and the optical modulator 300 described above. The optical receiver 700 receives an optical signal input from the outside via an optical transmission path, separates four signals (photocurrents) from the optical signal subjected to, for example, polarization multiplexing QAM, and outputs the separated signals. The receiver circuit 600 converts the four photocurrents into voltages, amplifies the voltages, and outputs the voltages. According to the optical transceiver module 500 having the above configuration, since the semiconductor integrated circuit 200 on which the driving circuit 100 is mounted is used, a broadband optical transceiver module capable of generating an optical signal having good waveform quality is realized.

According to the driving circuit 100 of the present embodiment described above, each of the collector currents of the bipolar transistors 10a and 10b changes in accordance with the input signal. The collector current of the bipolar transistor 10a is output as one of a pair of output signals from the output signal terminal 92a via the bipolar transistor 11a, the inductor 40a, the bipolar transistor 12a, and the inductor 41a. The collector current of the bipolar transistor 10b is output as the other of the pair of output signals from the output signal terminal 92b via the bipolar transistor 11b, the inductor 40b, the bipolar transistor 12b, and the inductor 41b. At this time, by the presence of the pair of inductors 41a and 41b, it is possible to give peaking on the high-frequency side to the frequency characteristic of the voltage gain at the output signal terminals 92a and 92b, and by the presence of the pair of inductors 40a and 40b, it is possible to effectively increase the peaking on the high-frequency side of the frequency characteristic of the voltage gain at the output signal terminals 92a and 92b while maintaining the linearity of the amplification operation. In addition, since the voltage amplitudes at the collectors of the pair of bipolar transistors 12a and 12b are divided by the pair of bipolar transistors 12a and 12b and the pair of bipolar transistors 11a and 11b, it is possible to reduce the possibility of deterioration of the bipolar transistors 12a and 12b. In addition, the presence of the inductors 40a and 40b makes it possible to suppress the voltage amplitudes of the bases and the voltage amplitudes of the emitters of the bipolar transistors 12a and 12b, and capacitances of the bipolar transistors 12a and 12b as viewed from each of the collectors thereof are reduced. As a result, the bandwidth of the driving circuit 100 can be broadened. That is, the driving circuit 100 of the present embodiment can improve the high-frequency gain while maintaining the linearity of the amplification operation, and can also improve the reliability of the circuit.

Further, a DC voltage is applied as a first bias voltage to the respective bases of the pair of bipolar transistors 11a and 11b, and a voltage varying in accordance with the respective collector voltages of the bipolar transistors 12a and 12b is applied as a second bias voltage to the respective bases of the pair of bipolar transistors 12b and 12a. With this configuration, the voltage amplitudes of the collectors of the pair of bipolar transistors 12a and 12b can be divided in a well-balanced manner between the pair of bipolar transistors 12a and 12b and the pair of bipolar transistors 11a and 11b, and the voltage amplitudes between the collectors and emitters of the pair of bipolar transistors 12a and 12b are made smaller than the voltage amplitudes at the collectors. As a result, the possibility of deterioration of the bipolar transistors 12a and 12b in the driving circuit 100 can be further reduced.

In addition, the driving circuit 100 includes the bias circuit 80 that supplies a second bias voltage to each base of the pair of bipolar transistors 12a and 12b. The bias circuit 80 includes the connection node 95, the resistor 22a connected between the collector of the bipolar transistor 12a and the base of the bipolar transistor 12a, the resistor 22b connected between the collector of the bipolar transistor 12b and the base of the bipolar transistor 12b, the resistor 21a connected between the base of the bipolar transistor 12a and the connection node 95, the resistor 21b connected between the base of the bipolar transistor 12b and the connection node 95, the capacitor 31a connected between the base of the bipolar transistor 12a and the connection node 95, the capacitor 31b connected between the base of the bipolar transistor 12b and the connection node 95, and the current source 50 connected between the connection node 95 and the ground line 70b. With such a circuit configuration, the voltage amplitude of the collector of the bipolar transistor 12a (12b) at low frequencies is divided by the resistor 22a (22b) and the resistor 21a (21b), and the divided voltage amplitude is applied to the base of the bipolar transistor 12a (12b). The voltage amplitude of the collector of the bipolar transistor 12a (12b) at high frequencies is divided by the capacitor 31a (31b) and the collector-base capacitance of the bipolar transistor 12a (12b), and the divided voltage amplitude is applied to the base of the bipolar transistor 12a (12b). Thus, in a wide range of frequencies from low frequencies to high frequencies, each voltage amplitude between each of the collectors and each of the emitters of the pair of bipolar transistors 12a and 12b is made smaller than the voltage amplitude at each of the collectors of the pair of bipolar transistors 12a and 12b, so that the voltage amplitudes at the collectors of the pair of bipolar transistors 12a and 12b can be divided by the pair of bipolar transistors 12a and 12b and the pair of bipolar transistors 11a and 11b in a well-balanced manner. As a result, the possibility of deterioration of the bipolar transistors 12a and 12b in the driving circuit 100 can be further reduced.

Furthermore, a spiral inductor in which wiring is formed in a spiral shape is used for each of the inductors 40a, 40b, 41a, and 41b. In this case, it is possible to improve the high-frequency gain while maintaining the miniaturization of the circuit.

Furthermore, the pair of inductors 40a and 40b and the pair of inductors 41a and 41b are set such that the current values in the collectors of the bipolar transistors 12a and 12b are positive. With this configuration, linearity of signal amplification can be maintained.

In addition, in the semiconductor integrated circuit 200 including the driving circuit 100 and the input circuit 110 according to the present embodiment, the bandwidth can be increased while maintaining the linearity of the amplification operation.

While the principles of the disclosure have been illustrated and described in preferred embodiments, it will be recognized by those skilled in the art that the disclosure may be modified in arrangement and detail without departing from such principles. The present disclosure is not limited to the specific configuration disclosed in the present embodiment. Accordingly, it is intended to claim all modifications and changes coming within the scope of the appended claims and their spirit.

Figure 9:
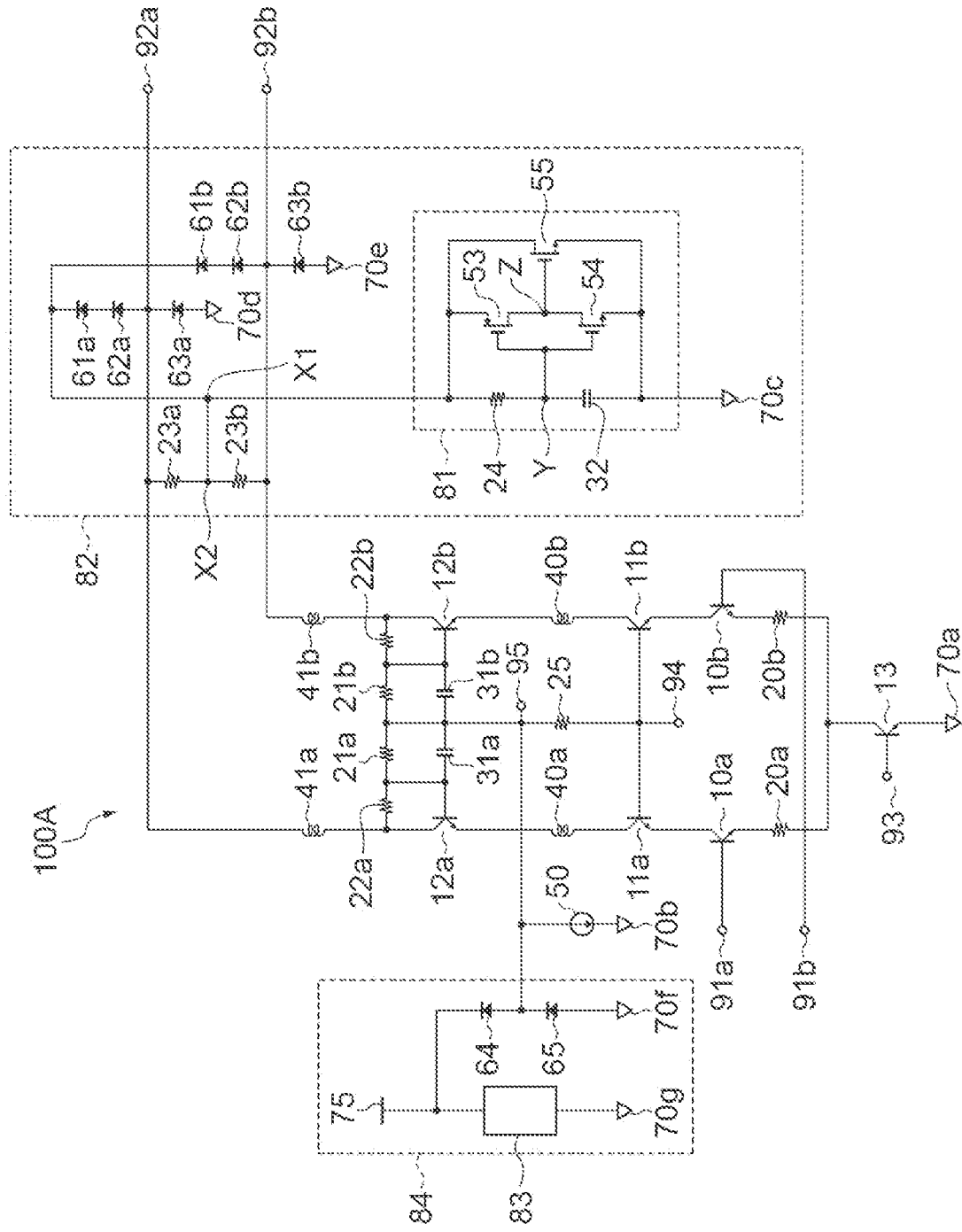
FIG. 9 is a circuit diagram showing a configuration of a driving circuit 100A according to a modification.

FIG. 9 is a circuit diagram showing a configuration of a driving circuit 100A according to a modification. The difference between the driving circuit 100A and the driving circuit 100 according to the above embodiment is that the driving circuit 100A is provided with ESD (Electro-Static Discharge) protection circuits 82, 84 and a resistor 25 for protecting an internal circuit in the driving circuit 100A when an ESD current is generated.

The ESD protection circuit 82 is connected between the output signal terminals 92a, 92b and the pair of inductors 41a, 41b, and includes diodes 61a, 61b, 62a, 62b, 63a, 63b, resistors 23a, 23b, and a clamp circuit 81.

The resistors 23a and 23b constitute an intermediate voltage circuit for generating an intermediate voltage of the differential signal between the output signal terminals 92a and 92b. That is, the resistor 23a is connected between the output signal terminal 92a and a connection point (second node) X2. The resistor 23b is connected between the output signal terminal 92b and the connection point (second node) X2. The resistor 23b has a resistance value substantially equal to the resistance value of the resistor 23a. The resistors 23a and 23b constitute the intermediate voltage circuit having the second node X2 as an output. The intermediate voltage circuit generates an output common mode voltage, which is an intermediate voltage between the output signal terminal 92a and the output signal terminal 92b, at the node X2, when no ESD occurs (when no signal is input to the pair of input signal terminals 91a and 91b and the internal circuit of the driving circuit 100A does not perform an amplification operation (no-signal state) or when it performs an amplification operation of the differential signal). When ESD occurs, the intermediate voltage circuit generates a voltage substantially equal to the intermediate voltage between the output signal terminals 92a and 92b at the second node X2, until the diodes 61a, 62b, 62a, and 62b described later are turned on. After the diodes 61a, 61b, 62a, and 62b are turned on, the voltage at the second node X2 is no longer the intermediate voltage between the output signal terminals 92a and 92b. For example, the voltage of the second node X2 becomes a voltage value exceeding a predetermined voltage of the external power supply 106 shown in FIG. 3 owing to the input of the ESD voltage. The resistance values of the resistors 23a and 23b are preferably at least 10 times or more, more preferably 100 times or more the resistance values of load resistances 104a and 104b of the external load 102. In the former case, a combined load resistance is about 90% of the resistance values of the load resistances 104a and 104b, and in the latter case, the combined load resistance is about 99% of the resistance values of the load resistances 104a and 104b, thereby suppressing the influence of the intermediate voltage circuit on the signal voltage output during the amplification operation. In the present embodiment, for example, the resistance values of the resistors 23a and 23b are set to 5 kΩ. The output common mode voltage generated by the resistors 23a and 23b is, for example, 4.0 V. Note that "the resistance values are substantially equal" means that the resistance values may be different from each other within a practically allowable range. The allowable range is, for example, a relative error of 5% or less. The intermediate voltage circuit is, for example, a resistive voltage dividing circuit having a voltage dividing ratio of 1/2.

The diodes 61a and 62a are diodes for ESD protection connected in series to each other. For example, the anode of the diode 62a is connected to the output signal terminal 92a, and the cathode of the diode 61a is connected to a node X1. The diodes 61b and 62b are diodes for ESD protection connected in series to each other. For example, the anode of the diode 62b is connected to the output signal terminal 92b, and the cathode of the diode 61b is connected to the node X1. These diodes 61a, 61b, 62a, and 62b are, for example, PN junction diodes formed in a P-type well on a semiconductor chip. The diodes 61a, 61b, 62a, and 62b serve as discharge paths when a positive ESD voltage is input to the output signal terminals 92a and 92b.

The diodes 63a and 63b are diodes for ESD protection, and have cathodes connected to the output signal terminals 92a and 92b and anodes connected to ground lines 70d and 70e, respectively. These diodes 63a and 63b are, for example, PN junction diodes formed in an N-type well on a semiconductor chip. The diodes 63a and 63b serve as discharge paths when a negative ESD voltage is input to the output signal terminals 92a and 92b.

The clamp circuit 81 includes a resistor 24, a capacitor 32, and MOS transistors 53, 54, and 55. The clamp circuit 81 has a function of connecting the node X1 to the ground potential by setting the resistance between the node X1 and a ground line 70c to a low resistance value when a positive ESD voltage is generated on the node X2 as a trigger. Here, in this embodiment, the node X2 and the node X1 are electrically connected to each other, and substantially equal potentials are generated therein. The clamp circuit 81 is a circuit for preventing dielectric breakdown of the internal circuit in the driving circuit 100A by suppressing the flow of discharge current due to ESD in the output signal terminals 92a and 92b into the internal circuit. A generally used clamp circuit is often connected between an internal power supply and a ground line. On the other hand, the driving circuit 100A of the present modification is an open collector circuit, and is terminated at, for example, an external power supply having the power supply voltage of 5.0 V. The internal power supply voltage of the driving circuit 100A is, for example, 3.3 V, which is smaller than the output common mode voltage (for example, 4.0 V) when the external load 102 is connected to the output signal terminals 91a and 92b. As a result, in the configuration in which the clamp circuit 81 is connected to the internal power supply, when the driving circuit 100A performs the amplification operation, the two-stage diode 61a and 62a or the two-stage diode 61b and 62b are turned on and prevents a current from flowing from the output signal terminals 92a and 92b to the internal power supply. However, there is a concern that the maximum voltage at the output signal terminals 92a and 92b increases when ESD occurs and ESD protection becomes insufficient. Therefore, in the present modification, the clamp circuit 81 is connected between the node X1 where the output common mode voltage is generated and the ground line 70c. The clamp circuit 81 has a configuration in which internal elements are selected and a circuit is designed for the voltage of the node X1.

The resistor 24 and the capacitor 32 constitute a detection circuit for detecting that the ESD voltage is input to the output signal terminals 92a and 92b based on the intermediate voltage, and form a low-pass filter (also referred to as an integration circuit). That is, the resistor 24 and the capacitor 32 are connected in series between the node X1 and the ground line 70c. With such a configuration, for example, when a step-like voltage pulse is generated in the node X1, at a contact point (node) Y between the resistor 24 and the capacitor 32, a voltage corresponding to the voltage of the node X1 is generated after a delay time corresponding to a time constant determined by the product of the resistance value of the resistor 24 and the capacitance of the capacitor 32.

MOS transistors 53, 54 constitute an inverter circuit. The MOS transistor 53 is a P-type MOS transistor having a source connected to the node X1, a drain connected to a node Z, and a gate connected to the node Y. The MOS transistor 54 is an N-type MOS transistor, and has a source connected to the ground line 70c, a drain connected to the drain of the MOS transistor 53 via the node Z, and a gate connected to the node Y. In this inverter circuit, when the voltage at the node X1 rises and when the voltage at the node Y is lower than the threshold voltage of the inverter circuit, the MOS transistor 53 is turned on and the output at the node Z of the inverter circuit becomes substantially equal to the voltage at the node X1. On the other hand, when the voltage of the node Y is higher than the threshold voltage, the MOS transistor 54 is turned on, and the output of the inverter circuit becomes substantially equal to the voltage of the ground line 70c. That is, when the voltage of the node Y is low, the voltage of the node Z becomes high, and when the voltage of the node Y is high, the voltage of the node Z becomes low, and the voltage of the node Z is inverted with respect to the voltage of the node Y. Here, in the present modification, the inverter circuit has a one stage configuration, but may be changed to a configuration in which an odd number of three or more inverting circuits are cascade-connected.

A MOS transistor 55 is a switching element constituted by an N-type MOS transistor, and has a drain connected to the node X1, a source connected to the ground line 70c, and a gate connected to the node Z which is an output node of the inverter circuit. The MOS transistor 55 is a switching element (switching circuit) which is turned on/off in accordance with the output of the inverter circuit, and operates so as to be turned on when the voltage of the node Z is higher than the threshold voltage of the MOS transistor 55 to reduce the drain-source resistance (this state is referred to as an on-state). On the other hand, the MOS transistor 55 is turned off when the voltage of the node Z is lower than the threshold voltage of the MOS transistor 55, and operates to increase the drain-source resistance. With such a configuration, the MOS transistor 55 performs switching using the voltage of the node Y as a trigger, and functions to connect the node X1 to the ground potential with low resistance when the voltage of the node X1 rises.

The ESD protection operation in the driving circuit 100A of the above configuration will be described. The ESD may occur in either one or both of the output signal terminals 92a and 92b. For example, in FIG. 3, when the electric wiring 105a is connected to the output signal terminal 92a, there is a possibility that ESD occurs at the output signal terminal 92a. Similarly, when connecting the electric wiring 105b to the output signal terminal 92b, there is a possibility that ESD occurs at the output signal terminal 92b. Further, when connecting the electric wiring 105c to the output signal terminal 103c in a state in which the electric wirings 105a and 105b are connected to the IC 101, there is a possibility that ESD occurs in both of the output signal terminals 92a and 92b. Since the ESD protection operation is the same in any cases, the description will be made without distinction.

First, when a negative ESD voltage is input to the output signal terminals 92a and 92b, a current flows from the ground lines 70d and 70e to the output signal terminals 92a and 92b via the diodes 63a and 63b. As a result, it is possible to suppress an increase in negative ESD voltage at the output signal terminals 92a and 92b, suppress a discharge current due to ESD from flowing to a circuit inside the ESD protection circuit 82, and prevent dielectric breakdown of the driving circuit 100A.

Next, when a positive ESD voltage is input to the output signal terminals 92a and 92b, a discharge current flows from the output signal terminals 91a and 91b to the node X1 via the diodes 61a, 62a, 61b, and 62b, and via the resistors 23a and 23b, and the voltage of the node X1 increases. By the detection circuit of the clamp circuit 81, the voltage rise of the node Y is delayed as compared with that of the node X1. Accordingly, the voltage of the node Y becomes lower than the threshold voltage of the inverter circuit, the MOS transistor 53 of the inverter circuit of the clamp circuit 81 is turned on, and the voltage of the node Z rises. As a result, the MOS transistor 55 is turned on, and the resistance between the first node X1 and the ground line 70c becomes small, so that the voltage rise of the node X1 is suppressed. In this way, it is possible to prevent dielectric breakdown of the driving circuit 100A.

In the driving circuit 100A of the present modification, as described above, current flows from the output signal terminals 92a and 92b to the node X1 via the diodes 61a, 62a, 61b, 62b, and the resistors 23a, 23b. Therefore, as compared with the case where there are no resistors 23a and 23b as in a driving circuit described in Japanese Unexamined Patent Application Publication No. 2015-173214, for example, the voltage rise of the node X1 is faster, and the MOS transistor 55 is turned on at a faster timing. As a result, the voltage rise of the node X1 can be further suppressed, and the driving circuit 100A can be more reliably protected.

In the state where the driving circuit 100A is used under normal condition (the state shown in FIG. 3), the voltages of the node X1 and the node Y coincide with each other, and the MOS transistor 55 is turned off. Therefore, the clamp circuit 81 does not affect the operation of the driving circuit 100A. Here, even in a state where the driving circuit 100A is used under normal condition, there is a possibility that the voltage of the node X fluctuates due to, for example, an amplification operation of the driving circuit 100A or a voltage fluctuation of the external power supply 106. Therefore, it is desirable to appropriately design the threshold voltage and the like of the clamp circuit 81 so that the MOS transistor 55 is not erroneously turned on due to such a voltage variation.

In the driving circuit 100A of this modification, the power supply voltage side (node X1) of the clamp circuit 81 is biased by the output common mode voltage generated by the resistors 23a and 23b. As a result, when the driving circuit 100A is not performing an amplification operation (no signal state), the anode-cathode voltages of the diodes 61a, 62a, 61b, and 62b become 0 V. Further, when the driving circuit 100A amplifies and outputs the differential signal, if the difference between the voltage of the output signal terminals 92a, 92b and the output common mode voltage is smaller than the sum (for example, 1.2 V) of each rising voltage (for example, 0.6 V) of the diodes 61a, 62a, 61b and 62b, the diodes 61a, 62a, 61b, and 62b are not turned on and remain high resistance. When the voltage changes at the output signal terminals 92a and 92b are ±1.2 V, the maximum amplitude of the output signal is 2.4 V at single-ended, and 4.8 V at differential. Note that "single-ended" refers to a voltage value for one of the output signal terminals 92a and 92b, and "differential" refers to, for example, a differential voltage between the output signal terminals 92a and 92b. Even if the diodes 61a, 62a, 61b, and 62b are not turned on, when the forward voltages of the diodes 61a, 62a, 61b, and 62b increase, the depletion layer decreases and the anode-cathode capacitance increases. At this time, since the operating bandwidth of the driving circuit 100A decreases as the forward voltage increases, it is desirable to set the forward voltages of the diodes 61a, 62a, 61b, and 62b to be small.

On the other hand, if the power supply voltage side (a node corresponding to the node X1) of the clamp circuit 81 is not biased but floated as in the driving circuit described in the above-mentioned Japanese Unexamined Patent Application Publication, there is a possibility that the diodes 61a, 62a, 61b, and 62b are turned on by the amplifying operation of the driving circuit 100A resulting the output signal waveform being distorted. This may deteriorate the linearity of the output signal. In addition, since the diodes 61a, 62a, 61b, and 62b have large forward voltages and large anode-cathode capacitances, the operating bandwidth of the driving circuit 100A may decrease.

To be more specific, in the case of the configuration in which the node X1 is in the floating state, in the driving circuit 100A in the no-signal state, the voltage of the node X1 is lower than that of the output signal terminals 92a and 92b by the sum of the rising voltages of the diodes 61a, 62a, 61b, and 62b due to the leakage current from the node X1 to the ground line 70c. For example, when the MOS transistor 55 is in the OFF state, the drain-source resistance is much larger than the low resistance value (ON resistance) in the ON state. However, even when the resistance value is high, a slight leakage current flows between the drain and the source. As a result, the voltage of the node X1 becomes a voltage (for example, 2.8 V) which is lower than the output common mode voltage (for example, 4.0 V) by the sum of the rising voltages (for example, 1.2 V). At this time, since the forward voltage between the anode and the cathode of each of the diodes 61a, 62a, 61b, and 62b is large (for example, 0.6 V), the anode-cathode capacitance increases, and the operating bandwidth of the driving circuit 100A may decrease.

Further, in the case of the floating configuration, when the voltage of the output signal terminal 92a or the voltage of the output signal terminal 92b rises due to the amplification operation of the driving circuit 100A, each forward voltage of the diodes 61a, 62a or the diodes 61b, 62b becomes large (for example, 0.6 V or more), so that the diodes 61a, 62a or the diodes 61b, 62b is turned on. As a result, a current (charging current) flows from the output signal terminal 92a or the output signal terminal 92b to the node X1, which may cause a problem of distortion of the output signal waveform. Note that the charging current stops when the voltage of the node X1 rises and each forward voltage of the diodes 61a, 62a, 61b, and 62b becomes equal to or lower than the rising voltage. Therefore, this problem is likely to occur immediately after the driving circuit 100A enters the amplifying operation from the no-signal state. However, since the voltage of the node X1 gradually decreases due to the leakage current, there is a possibility that the charging current continues to be generated with a constant amount and frequency until the forward voltages of the diodes 61a, 62a, 61b, and 62b become equal to or lower than the rising voltage again.

The above-described problem with the charging current in the case of the floating configuration may be more serious when the input/output signal of the driving circuit 100A is not a digital signal (for example, a rectangular wave) but an analog signal (for example, a sine wave). For example, when the input/output signals are rectangular waves, since the input/output signals constitute a differential signal, one of the output signal terminals 92a and 92b is high (maximum voltage) except for the high-low transition, and the charging of the node X1 via the diodes 61a, 62a or the diodes 61b, 62b is fast. On the other hand, when the input signal is a sine wave, since the input/output signal is almost always in the transition state and lower than the maximum voltage, charging of the node X1 via the diodes 61a, 62a or the diodes 61b, 62b is slow. As a result, there is a possibility that the problem that the output signal waveform is distorted occurs with higher frequency for a longer time during the amplification operation in the analog signal as compared with the digital signal.

Similarly, the above-described problem associated with the charging current in the case of the floating configuration may become more significant when the input/output signal of the driving circuit 100A is not an amplitude-constant modulated signal (for example, an NRZ (Non Return to Zero) signal) but an amplitude-modulated signal having multiple values (for example, a PAM (Pulse Amplitude Modulation) 4 signal). This is because a frequency at which the amplitude of the input/output signal becomes maximum is lower for the modulated signal whose amplitude differs according to the logical value than for the modulated signal whose amplitude is constant. As a result, charging of the node X1 via the diodes 61a, 62a or the diodes 61b, 62b is delayed, and there is a possibility that a problem such as distortion of an output signal waveform occurs with high frequency for a long time during an amplification operation in the case of an amplitude-modulated signal having multiple values as compared with a constant-amplitude modulated signal.

In the present modification, for example, an amplitude-constant binary signal (for example, an NRZ signal), an amplitude-modulated signal having multiple values (for example, a PAM4 signal), or the like is used as the input/output signal. When the input/output signal is the amplitude modulated signal having multiple values, there is a possibility that the above-described problem associated with the charging current in the case of the floating configuration becomes more significant. However, in the present modification, since the node X1 is electrically connected to the node X2, the node X1 is biased at the output common mode voltage by the resistors 23a, 23b, so that such a problem is suppressed. When the voltage change of the output signal terminals 92a and 92b due to the output signal is larger than the rising voltage of the diodes 61a, 62a, 61b, and 62b, it is possible to avoid the turn-on of the diodes by adopting a configuration in which the number of stages of the diodes is increased, for example, by changing to a configuration in which three or more stages of diodes are included instead of the diodes 61a, 62a and the diodes 61b, 62b.

As described above, according to the configuration of the driving circuit 100A, since the path for the discharge current when the ESD is input is configured by the ESD protection diodes and the resistors, the protection of the driving circuit 100A against the ESD is further ensured. In addition, by biasing the clamp circuit 81 with the output common mode voltage, it is possible to prevent an increase in the capacitance between the anode and the cathode of the ESD protection diode and the turn-on of the ESD protection diode, and it is possible to perform an amplification operation with less distortion. As a result, it is possible to realize a driving circuit 100A having higher reliability against ESD capable of performing an amplification operation with low distortion.

The configuration of the clamp circuit 81 in the ESD protection circuit 82 may be changed as appropriate. For example, the detection circuit having the configuration of the low-pass filter may be changed to a configuration of a high-pass filter in which connection positions of a resistor and a capacitor are interchanged, or a configuration of a capacitive voltage dividing circuit in which a plurality of capacitors are connected in series. In this case, the output voltage of the detection circuit changes substantially at the same time as the node X1, and returns to zero after lapse of a certain period. Therefore, in the clamp circuit 81, the inverter circuit is omitted, or the inverter circuit is constituted by two or more even-numbered stages.

In addition, the resistor 25 and then ESD protection circuit 84 are further provided in the driving circuit 100A of this modification.

The resistor 25 is a resistor having a predetermined resistance value (for example, 1 kΩ) inserted between the connection node 95 and the bias supply terminal 94. Due to the presence of such an element, for example, when a positive ESD voltage is input to the output signal terminals 92a and 92b, the bases of the bipolar transistors 11a and 11b are charged via the resistors 21a, 21b, 22a, 22b, and 25, and thus increases in the collector-base voltages of the bipolar transistors 11a and 11b are suppressed. Further, when the base-emitter voltages of the bipolar transistors 11a and 11b rise, the collector current flows and the emitters are also charged, so that the rises of the base-emitter voltages of the bipolar transistors 11a and 11b are also suppressed.

The ESD protection circuit 84 includes diodes 64 and 65, a clamp circuit 83, ground lines 70f and 70g, and a power source line 75. The diode 64 is connected between the connection node 95 and the power source line 75, the diode 65 is connected between the connection node 95 and the ground line 70f, and the clamp circuit 83 is connected between the power source line 75 and the ground line 70g.

In the driving circuit 100A having the above-described configuration, since the bases of the bipolar transistors 11a and 11b are separated from the external power supply, the base-collector voltage may exceed the maximum rating when ESD occurs, and the characteristics of the bipolar transistors 11a and 11b may deteriorate. The presence of the ESD protection circuit 84 suppresses an increase in the base voltage of the bipolar transistors 11a and 11b. In this way, it is possible to reduce the possibility of deterioration of the bipolar transistors 11a and 11b.

Here, a voltage of, for example, 2.5 V is generated at the connection node 95, and a voltage of, for example, 3.3 V is supplied from the internal power supply to the power source line 75. In this case, the reverse bias voltage between the anode and cathode of the diode 64 becomes, for example, 0.8 V, and the diode 64 is not turned on. A plurality of diodes may be connected in series between the connection node 95 and the power source line 75.

As described above, in the present modification, the possibility of deterioration of the bipolar transistors 11a and 11b can be reduced as compared with the above-described embodiment. Thus, a driving circuit having higher reliability against ESD can be realized. The driving circuit 100A includes the resistor 25. With such a configuration, when a positive ESD voltage is input to the output signal terminals 92a and 92b, an increase in the collector-base voltage and the base-emitter voltage of each of the bipolar transistors 11a and 11b is suppressed. This can reduce the possibility of deterioration of the bipolar transistors 11a and 11b due to generation of the ESD voltage.

Figure 10:
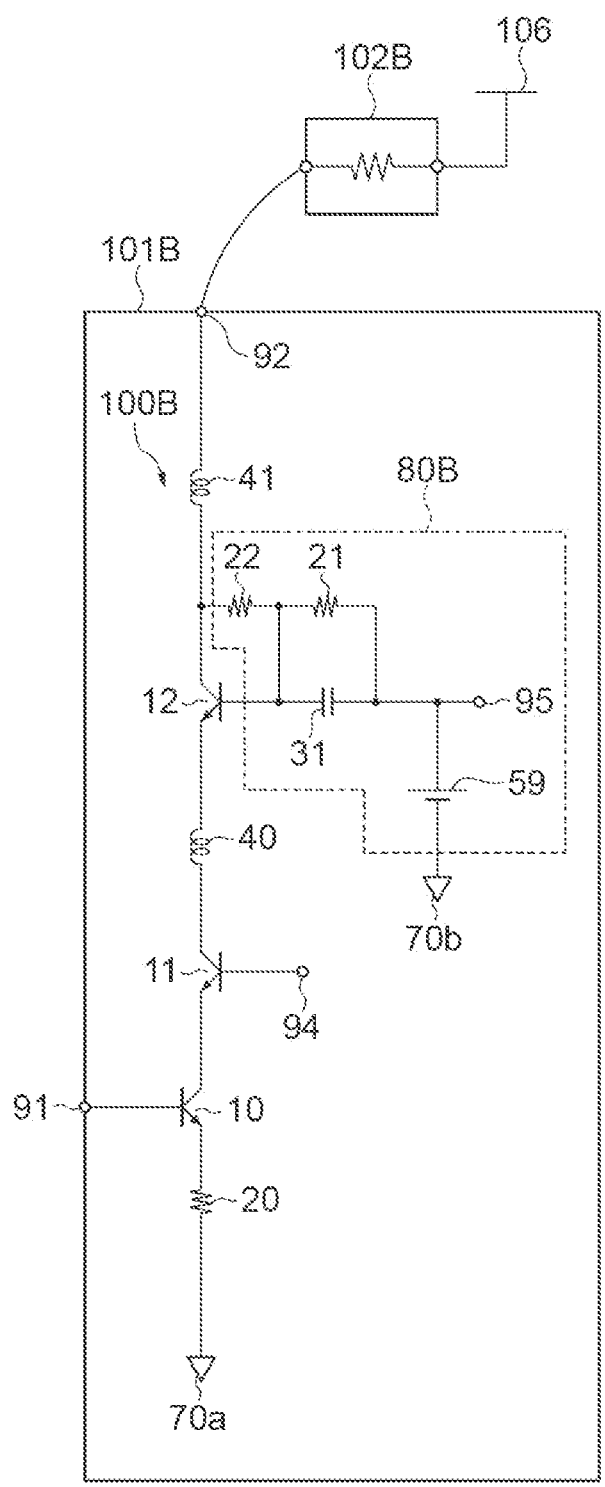
FIG. 10 is a circuit diagram showing a configuration of a driving circuit 100B according to another modification.

FIG. 10 is a circuit diagram showing a configuration of a driving circuit 100B according to another modification. The difference between the driving circuit 100B and the driving circuit 100 according to the above-described embodiment is that the driving circuit 100B has a configuration for amplifying a single-ended signal, that is, a configuration for amplifying a single-phase signal in the driving circuit 100. That is, the driving circuit 100B includes an input signal terminal 91, an output signal terminal 92, the bias supply terminal 94, the connection node 95, the ground line 70a, bipolar transistors 10, 11, 12, resistors 20, 21, 22, a capacitor 31, and inductors 40, 41. Here, in the single-ended configuration, the current source 50 is not necessarily required, and the bipolar transistor 13 is omitted. A direct-current power supply 59 connected between the connection node 95 and the ground line 70b is provided as a power supply circuit for supplying a bias to the base of the bipolar transistor 12. A bias circuit 80B is formed by the resistors 21 and 22, the connection node 95, the capacitor 31, and the direct-current power supply 59. In the driving circuit 100B having such a configuration, the output signal terminal 92 is connected to an external load 102B to which a predetermined voltage is applied by the external power supply 106.

Figure 11:
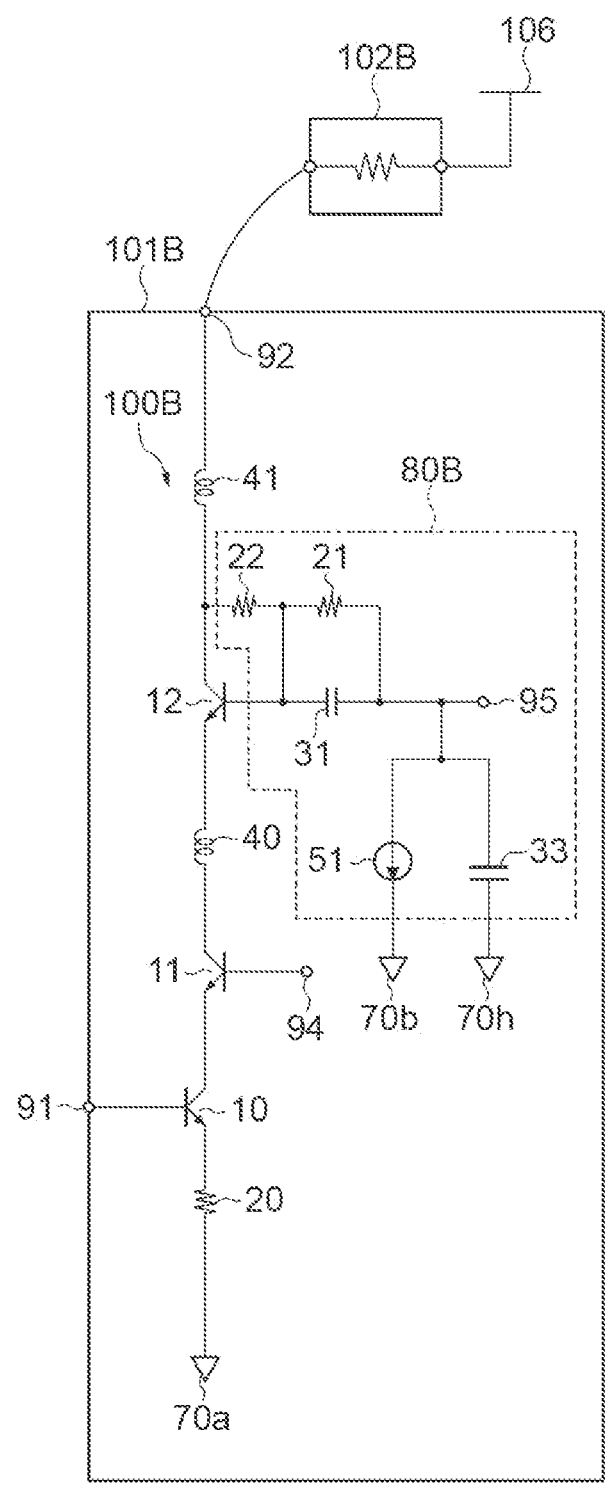
FIG. 11 is a circuit diagram showing a configuration of a driving circuit 100B according to another modification.

FIG. 11 is a circuit diagram showing the configuration of the driving circuit 100B according to another modification. This modification differs from the configuration shown in FIG. 10 in the configuration of the bias circuit 80B for supplying a bias to the base of the bipolar transistor 12. That is, it includes a current source 51 connected between the connection node 95 and the ground line 70b, and a capacitor 33 connected between the connection node 95 and the ground line 70h. Such a configuration of the bias circuit 80B can also supply a bias to the base of the bipolar transistor 12.

In the driving circuit 100B according to the above modification, Lithium Niobate (LN) modulators, electro-absorption (EA) modulators, and the like can be used as external loads.

Further, although the driving circuit 100 of the present embodiment is configured as an open collector circuit, a resistor may be inserted between the output signal terminals 92a, 92b and the internal power supply or ground line if the operation of the driving circuit 100 is not affected. For example, it is possible to insert a resistor having a resistance of, for example, 300Ω that is ten times or larger than the load resistances 104a, 104b of the external load 102, between the output signal terminal 92a and the internal power supply (for example, 3.3 V), and between the output signal terminal 92b and the internal power supply. In this case, the combined load resistance is about 90% of the load resistance 104a, 104b. Such a circuit can also be regarded substantially as an open collector circuit.

What is claimed is:

1. A driving circuit comprising:
   a first input signal terminal and a second input signal terminal;
   a first output signal terminal and a second output signal terminal;
   a current source that supplies a constant current;
   a first transistor including a first control terminal connected to the first input signal terminal, a first outflow terminal connected to a ground line via the current source, and a first inflow terminal;
   a second transistor including a second control terminal connected to the second input signal terminal, a second outflow terminal connected to the ground line via the current source, and a second inflow terminal;
   a third transistor including a third control terminal to which a first bias voltage is to be applied, a third outflow terminal connected to the first inflow terminal, and a third inflow terminal;
   a fourth transistor including a fourth control terminal to which the first bias voltage is to be applied, a fourth outflow terminal connected to the second inflow terminal, and a fourth inflow terminal;
   a first inductor and a second inductor each having a first inductance;
   a third inductor and a fourth inductor each having a second inductance that is larger than the first inductance;
   a fifth transistor including a fifth control terminal to which a second bias voltage is to be applied, a fifth outflow terminal connected to the third inflow terminal via the first inductor, and a fifth inflow terminal connected to the first output signal terminal via the third inductor; and
   a sixth transistor including a sixth control terminal to which the second bias voltage is to be applied, a sixth outflow terminal connected to the fourth inflow terminal via the second inductor, and a sixth inflow terminal connected to the second output signal terminal via the fourth inductor, wherein
   as the first bias voltage, a direct-current voltage is applied to each of the third control terminal and the fourth control terminal, and
   as the second bias voltage, a voltage signal that changes in accordance with a voltage of the fifth inflow terminal is applied to the fifth control terminal and a voltage signal that changes in accordance with a voltage of the sixth inflow terminal is applied to the sixth control terminal.

2. The driving circuit according to claim 1, further comprising a bias circuit that generates the second bias voltage, wherein the bias circuit includes:
   a connection node;
   a first resistor connected between the fifth inflow terminal and the fifth control terminal;
   a second resistor connected between the fifth control terminal and the connection node;

a first capacitor connected between the fifth control terminal and the connection node;
a third resistor connected between the sixth inflow terminal and the sixth control terminal;
a fourth resistor connected between the sixth control terminal and the connection node;
a second capacitor connected between the sixth control terminal and the connection node; and
a bias power supply connected between the connection node and the ground line.

3. The driving circuit according to claim 2, further comprising a resistor having an end connected to the connection node and another end connected to the third control terminal and the fourth control terminal.

4. The driving circuit according to claim 1, wherein the first inductor and the second inductor each have a wiring in a form of a spiral on a semiconductor chip.

5. The driving circuit according to claim 1, wherein the third inductor and the fourth inductor each have a wiring in a form of a spiral on a semiconductor chip.

6. The driving circuit according to claim 1, wherein the first inductance is set to be equal or smaller than a half of the second inductance.

7. A semiconductor integrated circuit comprising:
the driving circuit according to claim 1; and
an amplifier circuit that amplifies an input signal and outputs the amplified input signal to the driving circuit.

8. A driving circuit comprising:
an input signal terminal;
an output signal terminal;
a first transistor including a first control terminal connected to the input signal terminal, a first outflow terminal connected to a power source line, and a first inflow terminal;
a second transistor including a second control terminal to which a first bias voltage is to be applied, a second outflow terminal connected to the first inflow terminal, and a second inflow terminal;
a first inductor having a first inductance;
a second inductor having a second inductance that is larger than the first inductance; and
a third transistor including a third control terminal to which a second bias voltage is to be applied, a third outflow terminal connected to the second inflow terminal via the first inductor, and a third inflow terminal connected to the output signal terminal via the second inductor, wherein
as the first bias voltage, a direct-current voltage is applied to the second control terminal, and
as the second bias voltage, a voltage that changes in accordance with a voltage of the third inflow terminal is applied to the third control terminal.

9. The driving circuit according to claim 8, further comprising a bias circuit that generates the second bias voltage, wherein the bias circuit includes:
a connection node;
a first resistor connected between the third inflow terminal and the third control terminal;
a second resistor connected between the third control terminal and the connection node;
a capacitor connected between the third control terminal and the connection node; and
a bias power supply connected between the connection node and the power source line.

10. The driving circuit according to claim 8, wherein the first inductor has a wiring in a form of a spiral on a semiconductor chip.

11. The driving circuit according to claim 8, wherein the second inductor has a wiring in a form of a spiral on a semiconductor chip.

12. The driving circuit according to claim 8, wherein the first inductance is set to be equal to or smaller than a half of the second inductance.

13. A semiconductor integrated circuit comprising:
the driving circuit according to claim 8; and
an amplifier circuit that amplifies an input signal and outputs the amplified input signal to the driving circuit.

14. A driving circuit comprising:
a first input signal terminal and a second input signal terminal
a first output signal terminal and a second output signal terminal;
a current source that supplies a constant current;
a first transistor including a first control terminal connected to the first input signal terminal, a first outflow terminal connected to a ground line via the current source, and a first inflow terminal;
a second transistor including a second control terminal connected to the second input signal terminal, a second outflow terminal connected to the ground line via the current source, and a second inflow terminal;
a third transistor including a third control terminal to which a first bias voltage is to be applied, a third outflow terminal connected to the first inflow terminal, and a third inflow terminal;
a fourth transistor including a fourth control terminal to which the first bias voltage is to be applied, a fourth outflow terminal connected to the second inflow terminal, and a fourth inflow terminal;
a first inductor and a second inductor each having a first inductance;
a third inductor and a fourth inductor each having a second inductance that is larger than the first inductance;
a fifth transistor including a fifth control terminal to which a second bias voltage is to be applied, a fifth outflow terminal connected to the third inflow terminal via the first inductor, and a fifth inflow terminal connected to the first output signal terminal via the third inductor;
a sixth transistor including a sixth control terminal to which the second bias voltage is to be applied, a sixth outflow terminal connected to the fourth inflow terminal via the second inductor, and a sixth inflow terminal connected to the second output signal terminal via the fourth inductor, and
a bias circuit that generates the second bias voltage, wherein the bias circuit includes:
a connection node;
a first resistor connected between the fifth inflow terminal and the fifth control terminal;
a second resistor connected between the fifth control terminal and the connection node;
a first capacitor connected between the fifth control terminal and the connection node;
a third resistor connected between the sixth inflow terminal and the sixth control terminal;
a fourth resistor connected between the sixth control terminal and the connection node;
a second capacitor connected between the sixth control terminal and the connection node; and
a bias power supply connected between the connection node and the ground line.

15. The driving circuit according to claim 14, wherein the first inductor and the second inductor each have a wiring in a form of a spiral on a semiconductor chip.

16. The driving circuit according to claim 14, wherein the third inductor and the fourth inductor each have a wiring in a form of a spiral on a semiconductor chip.

17. The driving circuit according to claim 14, wherein the first inductance is set to be equal or smaller than a half of the second inductance.

18. The driving circuit according to claim 14, further comprising a resistor having an end connected to the connection node and another end connected to the third control terminal and the fourth control terminal.

19. A semiconductor integrated circuit comprising:
the driving circuit according to claim 14; and
an amplifier circuit that amplifies an input signal and outputs the amplified input signal to the driving circuit.

* * * * *